(12) United States Patent
Siegel et al.

(10) Patent No.: US 11,263,579 B1
(45) Date of Patent: Mar. 1, 2022

(54) AUTONOMOUS VEHICLE NETWORKS

(71) Applicant: Amazon Technologies, Inc., Seattle, WA (US)

(72) Inventors: Hilliard Bruce Siegel, Seattle, WA (US); Pragyana K. Mishra, Seattle, WA (US); Darren Ernest Canavor, Redmond, WA (US); Ethan Zane Evans, Sumner, WA (US); Tye Michael Brady, Southborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 841 days.

(21) Appl. No.: 15/369,536

(22) Filed: Dec. 5, 2016

(51) Int. Cl.
  *G06Q 10/08* (2012.01)
  *G01C 21/34* (2006.01)
  *G05D 1/02* (2020.01)

(52) U.S. Cl.
  CPC ......... *G06Q 10/0832* (2013.01); *G01C 21/34* (2013.01); *G05D 1/021* (2013.01); *G05D 2201/02* (2013.01)

(58) Field of Classification Search
  CPC .... G06Q 10/0832; G01C 21/34; G05D 1/021; G05D 2201/02
  See application file for complete search history.

(56) References Cited

U.S. PATENT DOCUMENTS

| | | | |
|---|---|---|---|
| 4,865,248 A | 9/1989 | Barth | |
| 4,954,962 A | 9/1990 | Evans et al. | |
| 5,040,116 A | 8/1991 | Evans et al. | |
| 5,386,462 A | 1/1995 | Schlamp | |
| 5,995,898 A | 11/1999 | Tuttle | |
| 6,344,796 B1 | 2/2002 | Ogilvie et al. | |
| 6,426,699 B1 | 7/2002 | Porter | |
| 6,690,997 B2 | 2/2004 | Rivalto | |
| 6,694,217 B2 | 2/2004 | Bloom | |
| 6,919,803 B2 | 7/2005 | Breed | |

(Continued)

FOREIGN PATENT DOCUMENTS

| | | |
|---|---|---|
| EP | 151896610 | 10/2015 |
| EP | 151926482 | 11/2015 |

(Continued)

OTHER PUBLICATIONS

"Experiments in Decentralized Robot Construction with Tool Delivery and Assembly Robots" in 2010 by Bolger et al. (Year: 2010).*

(Continued)

*Primary Examiner* — Zeina Elchanti
(74) *Attorney, Agent, or Firm* — Athorus, PLLC

(57) ABSTRACT

The present disclosure is directed to a network of autonomous vehicles, such as autonomous ground vehicles ("AGVs") that deliver items to and/or from a destination location and/or perform a service. For example, a community (e.g., neighborhood, apartment complex) may include a plurality of autonomous vehicles that deliver payloads to different locations (e.g., homes, apartments) within the community for use or consumption. Some of the payloads are community items (e.g., microwave, stove top, cooking utensils) that are shared by members of the community and transferred between locations within the community by autonomous vehicles.

17 Claims, 13 Drawing Sheets

(56) References Cited

U.S. PATENT DOCUMENTS

| | | | |
|---|---|---|---|
| 6,961,711 B1 | 11/2005 | Chee | |
| 6,970,838 B1 | 11/2005 | Kamath et al. | |
| 6,974,077 B1* | 12/2005 | Beyder | G06Q 10/08 |
| | | | 235/381 |
| 7,129,817 B2 | 10/2006 | Yamagishi | |
| 7,133,743 B2 | 11/2006 | Tilles et al. | |
| 7,188,513 B2 | 3/2007 | Wilson | |
| 7,337,686 B2 | 3/2008 | Sagi-Dolev | |
| 7,337,944 B2 | 3/2008 | Devar | |
| 7,339,993 B1 | 3/2008 | Brooks et al. | |
| 7,946,530 B1 | 5/2011 | Talmage | |
| 8,511,606 B1 | 8/2013 | Lutke et al. | |
| 8,899,903 B1 | 12/2014 | Saad et al. | |
| 8,956,100 B2 | 2/2015 | Davi et al. | |
| 8,989,053 B1 | 3/2015 | Skaaksrud et al. | |
| 9,033,285 B2 | 5/2015 | Iden et al. | |
| 9,079,587 B1 | 7/2015 | Rupp et al. | |
| 9,139,310 B1 | 9/2015 | Wang | |
| 9,216,587 B2 | 12/2015 | Ando et al. | |
| 9,216,857 B1 | 12/2015 | Kalyan et al. | |
| 9,235,213 B2 | 1/2016 | Villamar | |
| 9,244,147 B1 | 1/2016 | Soundararajan et al. | |
| 9,256,852 B1 | 2/2016 | Myllymaki | |
| 9,336,506 B2 | 5/2016 | Shucker et al. | |
| 9,373,149 B2 | 6/2016 | Abhyanker | |
| 9,381,916 B1 | 7/2016 | Zhu et al. | |
| 9,545,852 B2 | 1/2017 | Street | |
| 9,718,564 B1 | 8/2017 | Beckman et al. | |
| 9,824,324 B2* | 11/2017 | Trew | G06Q 10/0836 |
| 10,248,120 B1* | 4/2019 | Siegel | G05D 1/0088 |
| 2001/0045449 A1 | 11/2001 | Shannon | |
| 2001/0052842 A1 | 12/2001 | Asama et al. | |
| 2002/0016726 A1 | 2/2002 | Ross | |
| 2002/0087375 A1 | 7/2002 | Griffin et al. | |
| 2002/0111914 A1 | 8/2002 | Terada et al. | |
| 2002/0116289 A1 | 8/2002 | Yang | |
| 2002/0123930 A1 | 9/2002 | Boyd et al. | |
| 2003/0040980 A1 | 2/2003 | Nakajima et al. | |
| 2003/0141411 A1 | 7/2003 | Pandya et al. | |
| 2006/0136237 A1 | 6/2006 | Spiegel et al. | |
| 2006/0241521 A1 | 10/2006 | Cohen | |
| 2007/0016496 A1 | 1/2007 | Bar et al. | |
| 2007/0073552 A1 | 3/2007 | Hileman | |
| 2007/0150375 A1* | 6/2007 | Yang | G06Q 10/08 |
| | | | 705/339 |
| 2007/0170237 A1 | 7/2007 | Neff | |
| 2007/0194557 A1* | 8/2007 | Caporali | B60D 1/242 |
| | | | 280/493 |
| 2007/0293978 A1 | 12/2007 | Wurman et al. | |
| 2008/0115465 A1* | 5/2008 | Dickinson | A45C 13/021 |
| | | | 53/476 |
| 2008/0150679 A1 | 6/2008 | Bloomfield | |
| 2008/0154659 A1 | 6/2008 | Bettes et al. | |
| 2008/0167817 A1 | 7/2008 | Hessler et al. | |
| 2008/0301009 A1 | 12/2008 | Plaster et al. | |
| 2009/0062974 A1 | 3/2009 | Tamamoto et al. | |
| 2009/0063166 A1 | 3/2009 | Palmer | |
| 2009/0106124 A1 | 4/2009 | Yang | |
| 2009/0149985 A1 | 6/2009 | Chirnomas | |
| 2009/0198374 A1 | 8/2009 | Tsai et al. | |
| 2009/0236470 A1 | 9/2009 | Goossen et al. | |
| 2009/0299903 A1 | 12/2009 | Hung et al. | |
| 2009/0314883 A1 | 12/2009 | Arlton et al. | |
| 2011/0035149 A1 | 2/2011 | McAndrew et al. | |
| 2011/0264311 A1 | 10/2011 | Lee et al. | |
| 2012/0039694 A1 | 2/2012 | Suzanne | |
| 2012/0109419 A1 | 5/2012 | Mercado | |
| 2012/0219397 A1 | 8/2012 | Baker | |
| 2013/0073477 A1 | 3/2013 | Grinberg | |
| 2013/0081245 A1 | 4/2013 | Vavrina et al. | |
| 2013/0126611 A1 | 5/2013 | Kangas et al. | |
| 2013/0148123 A1 | 6/2013 | Hayashi | |
| 2013/0173146 A1 | 7/2013 | Atmur et al. | |
| 2013/0218799 A1 | 8/2013 | Lehmann et al. | |
| 2013/0261792 A1 | 10/2013 | Gupta et al. | |
| 2013/0262251 A1 | 10/2013 | Wan et al. | |
| 2013/0262252 A1 | 10/2013 | Lakshman et al. | |
| 2013/0262276 A1 | 10/2013 | Wan et al. | |
| 2013/0262336 A1 | 10/2013 | Wan et al. | |
| 2013/0264381 A1 | 10/2013 | Kim et al. | |
| 2013/0268118 A1 | 10/2013 | Grinstead et al. | |
| 2014/0022055 A1 | 1/2014 | Levien et al. | |
| 2014/0030444 A1 | 1/2014 | Swaminathan et al. | |
| 2014/0032034 A1 | 1/2014 | Raptopoulos et al. | |
| 2014/0052661 A1 | 2/2014 | Shakes et al. | |
| 2014/0136282 A1 | 5/2014 | Fedele | |
| 2014/0136414 A1 | 5/2014 | Abhyanker | |
| 2014/0254896 A1 | 9/2014 | Zhou et al. | |
| 2015/0006005 A1 | 1/2015 | Yu et al. | |
| 2015/0069968 A1 | 3/2015 | Pounds | |
| 2015/0102154 A1 | 4/2015 | Duncan et al. | |
| 2015/0120602 A1 | 4/2015 | Huffman et al. | |
| 2015/0129716 A1 | 5/2015 | Yoffe | |
| 2015/0153175 A1 | 6/2015 | Skaaksrud | |
| 2015/0158599 A1 | 6/2015 | Sisko | |
| 2015/0175276 A1 | 6/2015 | Koster | |
| 2015/0183528 A1 | 7/2015 | Walsh et al. | |
| 2015/0185034 A1 | 7/2015 | Abhyanker | |
| 2015/0227882 A1 | 8/2015 | Bhatt | |
| 2015/0246727 A1 | 9/2015 | Masticola et al. | |
| 2015/0259078 A1 | 9/2015 | Filipovic et al. | |
| 2015/0317597 A1 | 11/2015 | Shucker et al. | |
| 2015/0332206 A1 | 11/2015 | Trew et al. | |
| 2015/0338852 A1* | 11/2015 | Ramanujam | G08G 1/202 |
| | | | 701/2 |
| 2015/0367850 A1 | 12/2015 | Clarke et al. | |
| 2015/0370251 A1 | 12/2015 | Siegel et al. | |
| 2016/0009413 A1 | 1/2016 | Lee et al. | |
| 2016/0033966 A1 | 2/2016 | Farris et al. | |
| 2016/0104099 A1 | 4/2016 | Villamar | |
| 2016/0114488 A1 | 4/2016 | Medina et al. | |
| 2016/0144734 A1 | 5/2016 | Wang et al. | |
| 2016/0144982 A1 | 5/2016 | Sugumaran | |
| 2016/0200438 A1 | 7/2016 | Bokeno et al. | |
| 2016/0203649 A1* | 7/2016 | Berkobin | G06Q 20/12 |
| | | | 705/13 |
| 2016/0207627 A1 | 7/2016 | Hoareau et al. | |
| 2016/0257401 A1 | 9/2016 | Buchmueller et al. | |
| 2016/0266578 A1 | 9/2016 | Douglas et al. | |
| 2016/0299233 A1 | 10/2016 | Levien et al. | |
| 2016/0334229 A1 | 11/2016 | Ross et al. | |
| 2016/0345832 A1 | 12/2016 | Nagaraja et al. | |
| 2016/0364989 A1 | 12/2016 | Speasl et al. | |
| 2016/0366372 A1 | 12/2016 | Kuroda | |
| 2017/0023947 A1* | 1/2017 | McMillion | B64D 1/22 |
| 2017/0032315 A1 | 2/2017 | Gupta et al. | |
| 2017/0096222 A1 | 4/2017 | Spinelli et al. | |
| 2017/0098191 A1* | 4/2017 | Lee | G06Q 10/04 |
| 2017/0098378 A1 | 4/2017 | Soundararajan et al. | |
| 2017/0101017 A1 | 4/2017 | Streett | |
| 2017/0164319 A1 | 6/2017 | Skaaksrud et al. | |
| 2017/0167881 A1 | 6/2017 | Rander et al. | |
| 2017/0255896 A1* | 9/2017 | Van Dyke | A47G 29/14 |
| 2017/0286892 A1* | 10/2017 | Studnicka | G06Q 10/083 |
| 2017/0314939 A1 | 11/2017 | Carter et al. | |
| 2017/0320569 A1* | 11/2017 | Gordon | B64C 39/024 |
| 2018/0157258 A1* | 6/2018 | O'Brien | G05D 1/0088 |
| 2018/0232839 A1 | 8/2018 | Heinla et al. | |
| 2019/0049988 A1* | 2/2019 | Meij | G06Q 50/28 |
| 2019/0122178 A1* | 4/2019 | Kempf | G06Q 10/08355 |
| 2019/0220819 A1* | 7/2019 | Banvait | B64C 39/024 |

FOREIGN PATENT DOCUMENTS

| | | |
|---|---|---|
| EP | 151926490 | 11/2015 |
| EP | 151980943 | 12/2015 |
| EP | 161751359 | 6/2016 |
| EP | 161869078 | 9/2016 |
| EP | 161953724 | 10/2016 |
| EP | 162041537 | 12/2016 |
| JP | 2015510478 A | 4/2015 |
| JP | 2015514256 A | 5/2015 |
| WO | 2013148123 A1 | 10/2013 |
| WO | 2016025047 | 1/2017 |

(56) References Cited

FOREIGN PATENT DOCUMENTS

| WO | 2017076806 A1 | 5/2017 |
| WO | 2017076813 A1 | 5/2017 |
| WO | 2017076928 A1 | 5/2017 |
| WO | 2018024847 A1 | 2/2018 |
| WO | 2018024851 A1 | 2/2018 |
| WO | 2018024852 A1 | 2/2018 |

OTHER PUBLICATIONS

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http:www/dhl.com/content/dam/downloads/g0/about_us/logistics_insights/dhl_self_driving_vehicles.pdf), 39 pages.

DHL Trend Research, "Unmanned Aerial Vehici Fs in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

http://qz.com/613277/google-wants-to-deliver-packages-from-self-driving-trucks/.

http://www.geekwire.com/2016/google-pondering-drone-delivery-even-about-boxes-it-flies-to-front-doors/.

https://www.starship.xyz/.

* cited by examiner

AUTONOMOUS VEHICLE NETWORKS

BACKGROUND

Many companies, including "big box" retail and mail-order companies, package items (e.g., books, CDs, apparel, food, etc.) and/or groups of items together to be shipped in fulfilment of requests from customers (e.g., internal or external, retail or wholesale customers). Retailers, wholesalers, and other product distributors (which may collectively be referred to as distributors) typically maintain an inventory of various items that may be ordered by customers. This inventory may be maintained and processed at a materials handling facility. Such materials handling facilities may include, but are not limited to, one or more of: warehouses, distribution centers, cross-docking facilities, order fulfillment facilities, packaging facilities, shipping facilities, or other facilities or combinations of facilities for performing one or more functions of material (inventory) handling.

Ordered items are typically packed in shipping packages (e.g., corrugated boxes) and shipped to the customer's residence or place of business. The delivery of physical items to a customer's specified location is traditionally accomplished using a delivery system including a human controlled truck, bicycle, cart, etc. For example, a customer may order an item for delivery to their home. The item may be picked by a human agent from a materials handling facility, packed and shipped to the customer for final delivery by a shipping carrier, such as the United States Postal Service, FedEx, or UPS. An agent of the shipping carrier will load the item onto a truck that is driven to the final delivery location and a driver, or another human companion with the driver, will retrieve the item from the truck and complete the delivery to the destination. Over time, an increasing frequency and volume of deliveries of items from e-commerce and mail-order companies has resulted in an increased need for faster and more efficient delivery methods.

DETAILED DESCRIPTION

Figure 1:
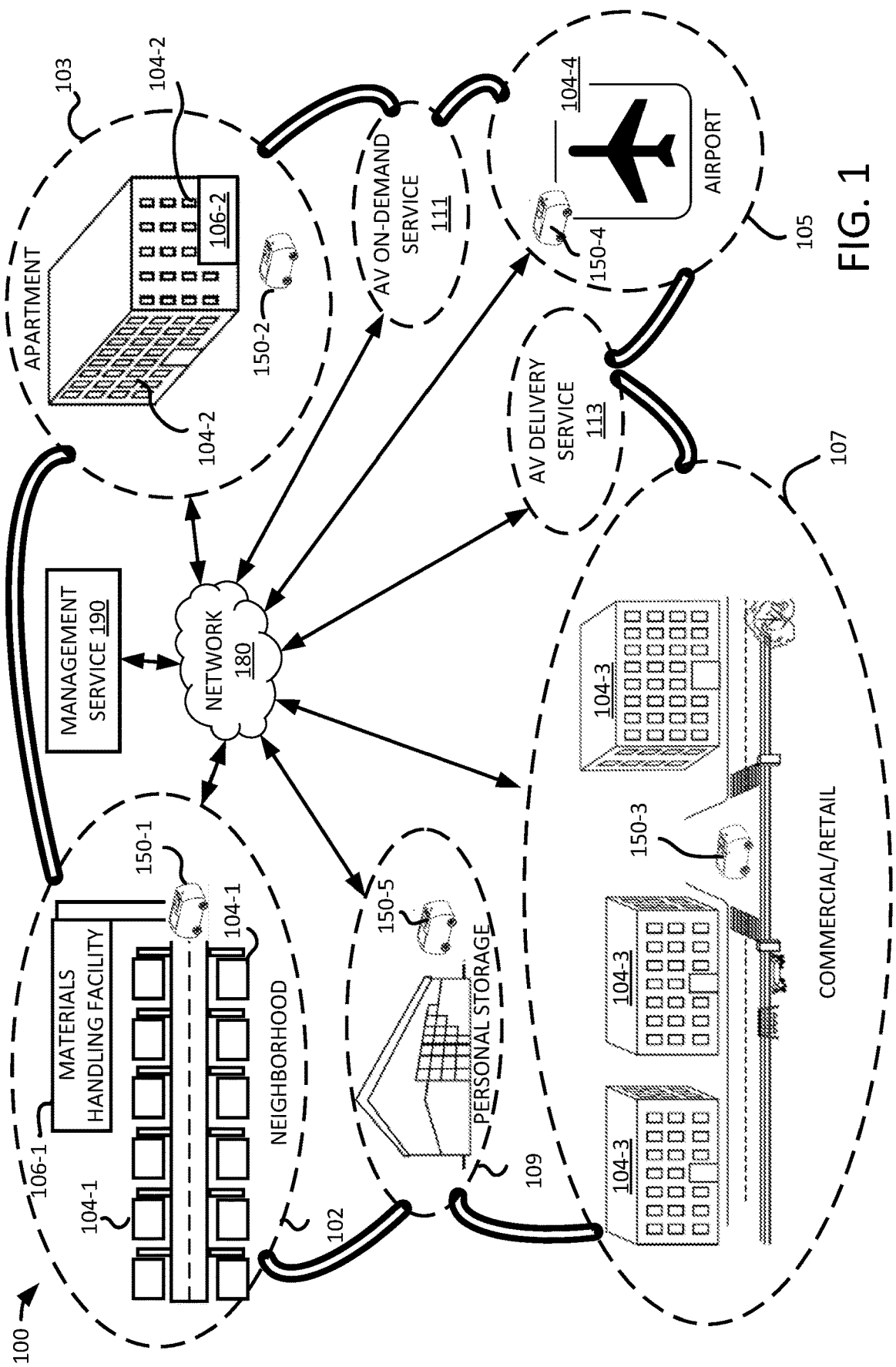
FIG. 1 is and environment with multiple interconnected autonomous vehicle networks, each network included in a community, in accordance with implementations of the present disclosure.

As is set forth in greater detail below, the present disclosure is directed to a network of autonomous vehicles, such as autonomous ground vehicles ("AGVs") that deliver items to and/or from a destination location and/or perform a service. For example, a community (e.g., neighborhood, apartment complex) may include a plurality of autonomous vehicles that deliver payloads to different locations (e.g., homes, apartments) within the community for use or consumption. Some of the payloads are community items (e.g., microwave, stove top, cooking utensils) that are shared by members of the community and transferred between locations within the community by autonomous vehicles.

In some implementations, the network of autonomous vehicles may include autonomous vehicles that are personally owned and/or leased by one or more users, autonomous vehicles that are owned, leased and/or maintained by a business and provided as a service to transport items, autonomous vehicles that are owned, maintained and/or leased by a community of users, or any combination thereof. For example, a community, such as a neighborhood, city, state, country, apartment building, office building, hotel, etc., may utilize and share a network of one or more autonomous vehicles to transport items between source locations and destination locations. Those items may be community items that are shared among the community, personal items owned by one or more users, items ordered for delivery, and the like. Users within the community may request an item and that item will be transported by an autonomous vehicle to a destination location specified by the user, optionally at a time specified by the user.

As used herein, a "community" is any group or location that includes one or more users. For example, a community may include users based on location, such as a residential neighborhood, a town, a city, an apartment building, a college campus, a dormitory, a hotel, a library, etc. Members or users within the community are individuals currently located in the community and/or associated with the community. For example, people that live in a neighborhood and/or visitors within the neighborhood are members of a neighborhood community. Likewise, people staying in a hotel or visiting the hotel are members of the hotel community during their time at the hotel. Alternatively, or an addition thereto, a community may be a group of related users, regardless of location. Users may be related based on a similarity, association, constraint, etc. For example, a community may include users that have a common interest (e.g., dogs, cars, farming), a common requirement (e.g., handicap accessibility), a common need, etc. As will be appreciated, a community and members within a community can be of any size and any number of members, may be permanent or temporary, and members may be permanent members regardless of their current physical location and/or relationship, or members may temporary. Likewise, members or users may be part of one or more communities.

FIG. 1 is an environment 100 with multiple interconnected autonomous vehicle networks, each network included in a community, in accordance with implementations of the present disclosure. In the illustrated example, there are five communities, a residential or neighborhood community 102, an apartment community 103, an airport community 105, a commercial and retail community 107, and a personal storage community 109. As will be appreciated, in various implementations there may be additional, fewer, and/or different communities and the ones provided are for example and explanation purposes only.

Each community may be serviced by one or more autonomous vehicles that form an autonomous vehicle network within the community. Each autonomous vehicle within a community may communicate with other autonomous vehicles within the network, may communicate with members of the community, and/or may communicate with the management service 390. Communication may be wired and/or wireless. For example, the management service 390 may operate on one or more remote computing systems and communicate with autonomous vehicles of the various communities and/or members of the various communities via a network 180, such as the Internet.

Referring first to the residential or neighborhood community 102, in this example, there are multiple locations 104-1 within the community 102. The locations may include private residences (homes), parks, etc., within the neighborhood community. Likewise, the community includes one or more autonomous vehicles 150-1 that service the community 102. The autonomous vehicles 150-1 may include privately owned autonomous vehicles and/or autonomous vehicles that are owned by one or businesses that are deployed to the community to provide a service to the community. For example, a business entity that operates or communicates with the management service 390 may own the autonomous vehicles 150-1 that service the community 102.

The autonomous vehicles 150-1 that service the residential or neighborhood community 102 may be used to deliver items to locations 104-1 within the community, deliver items between locations 104-1 within the community, retrieve items from other communities, deliver items to other communities, etc. In some implementations, the autonomous vehicles 150-1 may be configured to only operate and remain within the neighborhood community 102. In other implementations, the autonomous vehicles 150-1 associated with the neighborhood community may navigate beyond the neighborhood community into other communities. In such instances, those autonomous vehicles may dis-associate with the autonomous vehicle network of the neighborhood community and join a different autonomous vehicle network of another community, remaining in that community. Alternatively, the autonomous vehicle, even though departing the neighborhood community 102 may remain part of the autonomous vehicle network of the neighborhood community and later return to the neighborhood community.

For example, a user located within the neighborhood community 102 may submit a request that an autonomous vehicle retrieve an item from a business located in the commercial and retail community 107 and return that item to a location within the neighborhood community 102. The member, may submit the request to the management service 390 and the management service may determine one or more autonomous vehicles that are available and capable of fulfilling the request. For example, the management service may determine an autonomous vehicle that is associated with the neighborhood community 102 that is available and capable of navigating to the business located within the retail and commercial community 107, retrieve the requested item, navigate back to the neighborhood community 102, and deliver the item to a location 104-1 within the neighborhood community 102.

As another example, a member of the neighborhood community may submit a request to transport an item from a first location within the neighborhood community 102 to a second location within the neighborhood community. In such an example, the user may submit the request to the management service 390, the management service will determine an autonomous vehicle within the neighborhood community that is available and capable of transporting the item between the two locations, and instruct the autonomous vehicle to retrieve the item from the first location and transport the item to the second location.

In some implementations, a community, such as the neighborhood community 102, may include a materials handling facility 106-1 that is used to store one or more of allocated items, unallocated items, and/or community items. An allocated item, as used herein and discussed further below, is an item that is owed or otherwise associated with one or more members of a community. For example, an allocated item may include food owned by a member of the community that stores the food in the materials handling facility. Another example of an allocated item may be clothing, a bicycle, a lawn mower, etc. owned by a member of the community.

An unallocated item, as used herein and discussed further below, is any item that is not owned or otherwise associated with one or more members of a community and/or associated with the community (i.e., a community item). An unallocated item may be, for example, inventory of a business that is stored at the materials handling facility and available for purchase, lease, rent, etc. by members of the community. For instance, a marketplace may determine items often ordered and/or consumed by members of the community and store those items in the materials handling facility so they are immediately available for delivery to a member of the community when the item is ordered.

A community item, as used herein and discussed further below, is any item that is associated with the community and available for use by members of the community. For example, a community item may be a BBQ grill, a lawn mower, a stove top, a microwave, a cooler, etc.

As our society continues to evolve, the concept of owned items is deteriorating and opportunities for communities to share and utilize items is becoming more prevalent. With the disclosed implementations, members of a community can share items that are not frequently used, thereby reducing the space needed for items that were historically owned by each individual but not frequently used. For example, landscaping equipment (lawn mowers, rakes, shovels, etc.), when individually owned, often go unused for days, weeks, or more at a time. Utilizing the described implementations, those and other items may be community owned and shared among members of the community. Specifically, the disclosed implementations, remove the inconvenience of having to locate the item, retrieve and/or return the item when done using the item. Likewise, maintenance and cleaning of the items can also be reduced or eliminated. As discussed further below, community items may be stored, when not in use, in a materials handling facility. When a member of the community needs, or wants the item, the member submits a request for the item. The management service, upon receiving the request, temporarily allocates the item to the requesting member and instructs an autonomous vehicle to retrieve and transport the requested item to a location specified by the member of the community. As such, the item is available to the user, at the location of the user, when desired by the user. In a similar manner, when the user is done with the item, rather than the user having to clean and/or store the item, the management service sends instructions to the same or a different autonomous vehicle to retrieve the item. The autonomous vehicle may then route the item to another location for cleaning and/or storage and/or transport the item to another location for use by yet another member of the community.

As another example of a community, reference is made to the apartment community 103. Like the neighborhood community 102, the apartment community includes multiple locations 104-2 within the community 102. The locations 104-2 may include private residences (apartment), common areas within the apartment building, etc. Likewise, the community includes one or more autonomous vehicles 150-2 that service the community 103. The autonomous vehicles 150-2 may include privately owned autonomous vehicles and/or autonomous vehicles that are owned by one or more businesses that are deployed to the community to provide a service to the community. For example, an owner of the apartment building may own the autonomous vehicles 150-2 that service the community 103.

The autonomous vehicles 150-2 that service the apartment community 103 may be used to deliver items to locations 104-2 within the community, deliver items between locations 104-2 within the community, retrieve items from other communities, deliver items to other communities, etc. In some implementations, the autonomous vehicles 150-2 may be configured to only operate and remain within the apartment community 103. In other implementations, the autonomous vehicles 150-2 associated with the apartment community may navigate beyond the apartment community into other communities. In such instances, those autonomous vehicles may dis-associate with the autonomous vehicle network of the apartment community and join a different autonomous vehicle network of another community, remaining in that community. Alternatively, the autonomous vehicle, even though departing the apartment community 103 may remain part of the apartment community and later return to the apartment community 103.

For example, a member of the apartment community 103 may submit a request that an autonomous vehicle 150-2 transport an item from the apartment community to a personal storage location within the personal storage community 109. The member may submit the request to the management service 390 and the management service may determine one or more autonomous vehicles that are available and capable of fulfilling the request. For example, the management service may determine an autonomous vehicle that is associated with the apartment community 103 that is available and capable of retrieving the item from a location within the apartment community 103, transporting the item from the apartment community 103 to the personal storage community 109, and leaving the item at the personal storage community 109. Alternatively, as discussed herein, the management service may determine a series of autonomous vehicles that are capable of collectively transporting the item from the apartment community to the personal storage community. For example, a first autonomous vehicle may be selected to retrieve the item from a location within the apartment community and transport the item from the location within the apartment community to a transfer location. At the transfer location, the first autonomous vehicle may transfer the item to a second autonomous vehicle that will continue the transport of the item toward the personal storage location. The second autonomous vehicle may complete the transport of the item to the personal storage location and/or may transport the item along another leg of the transport to still another autonomous vehicle that continues the transport of the item from the apartment community 103 to the personal storage community 109.

Regardless of the number and/or types of autonomous vehicles involved in the transport, the user only need submit a request to transport the item. The management service 110, upon receiving the request, determines the transport parameters and coordinates the transport of the item from the source location to the destination location.

As another example, a member of the neighborhood community may submit a request to transport an item from a first location within the apartment community 103 to a second location within the apartment community (e.g., transport of an item between two apartments within the apartment building). In such an example, the user may submit the request to the management service 390, the management service will determine an autonomous vehicle within the apartment community 103 that is available and capable of transporting the item between the two locations, and instruct the autonomous vehicle to retrieve the item from the first location and transport the item to the second location. Such a transport may include, for example, navigating between floors of the apartment building. In such an example, determining if an autonomous vehicle is capable may include determining if the autonomous vehicle is capable of interacting with an elevator or a computing system that operates the elevator so that the autonomous vehicle can navigate between floors. In other examples, the autonomous vehicle need not be capable of interfacing with the elevator. For example, the elevator of an apartment building may be controlled by one or more computing systems that communicate with the management service. In such an example, the computing system controlling the elevator may receive instructions from the management service 390 relating to the movement of the autonomous vehicle. In response, the computing system that controls the elevators of the apartment building may determine a position of the autonomous vehicle and cause the elevator in which an autonomous vehicle is located to move between desired floors so that the autonomous vehicle can complete a transport and delivery of an item between floors of the apartment building.

The apartment community may also include a materials handling facility 106-2 that is used to store one or more of allocated items, unallocated items, and/or community items. Space is often at a premium in apartment buildings. As such, the use of community items and/or a materials handling facility to store allocated items on behalf of members of the community may be more important. For example, many items that were traditionally personally owned may be consolidated as community items, maintained in a materials handling facility associated with the apartment community 103, and delivered to different apartments or other locations by autonomous vehicles associated with the community when the item is desired by a member of the community. When the member of the community has finished using the item, the same or different autonomous vehicle may retrieve the item, return it to storage, transport it to a location for cleaning/maintenance, and/or transport the item to another location for use by another member of the community.

The implementations discussed, when utilized in an apartment community, or other forms of communities, remove the duplicity of each member of the community owning similar items that are not frequently used. For example, numerous kitchen items (e.g., pots, pans, dishes, microwaves, stove tops, suvees), landscaping items (e.g., mowers, trimmers, shovels, rakes), hobby items (e.g., game consoles, televisions, sewing machines, craft supplies), etc., may be community owned, stored in a materials handling facility when not in use, and delivered to a user specified location by an autonomous vehicle when the item is requested by a member of the community.

Referring next to the airport community 105, the airport community may include individuals arriving at the airport for a trip, returning to the airport from a trip, workers within the airport, etc. Like the other communities, the airport community may include one or more autonomous vehicles 150-4 that may be used to transport items between locations within the airport community 105 and/or transport items to and/or from the airport community. For example, an individual that lives in the neighborhood community 102 or the apartment community 103 may request that an autonomous vehicle retrieve the individuals bags from their home and transport those bags to the airport community 105. In such an example, the management service 390 may determine an autonomous vehicle 150-4 associated with the airport community to navigate to the location of the individual's bag, retrieve the bags, navigate with the bags back to the airport community and transfer those bags onto an airplane or other vehicle. For example, as part of the transport by the autonomous vehicle, and/or as part of the request, the individual may indicate an airline or destination of travel. Rather than the individual having to transport the bags to the airport, have the bags pass through security, etc., the autonomous vehicle may retrieve and transport the bags on the user's behalf. Not only does the use of an autonomous vehicle to transport an individual's bags to the airport simplify the travel process for the individual, it also improves the security and efficiency of the airport. For example, bags no longer need to be brought into the airport by individuals for screening. Instead, the bags can be transported by autonomous vehicles to secure areas for screening and then transported and loaded onto the airplanes 104-4.

As discussed above, the commercial and retail community 107 may likewise include a network of one or more autonomous vehicles that can be used to transport items between locations within the community, transport items from the commercial and retail community 107 to other communities, and/or retrieve items from other communities and deliver those items to locations within the commercial and retail community 107. For example, the commercial and retail community 107 may include a plurality of commercial and/or retail locations 104-3 and also include one or more autonomous vehicles 150-3. A merchant or business owner within the commercial and retail community 107 may submit a request to have an item transported from a location within the commercial and retail community 150-3 (e.g., the merchant's store) to a destination (e.g., a location of an individual that purchased the item). The management service 390, upon receiving the request determines an autonomous vehicle that is capable and available to transport the item.

While the above examples have been discussed with respect to each community including a network of one or more autonomous vehicles, in some implementations, multiple communities may be serviced by a single network of autonomous vehicles. Alternatively, or in addition thereto, services, such as the autonomous vehicle on-demand service 111 and/or the autonomous vehicle delivery service may be included in the environment 100. In such a configuration, the services 111, 113 may supplement or be an alternative to networks of autonomous vehicles within different communities. For example, rather than having a network of autonomous vehicles within the neighborhood community, individuals within the neighborhood community may submit a request for an item transport, the management service 390 may determine an autonomous vehicle available from the autonomous vehicle on-demand service 111 and/or the autonomous vehicle delivery service 113 that is capable and available to transport the item, and instruct the autonomous vehicle to navigate to a source location and transport the item to a destination location.

Likewise, in some implementations, one or more of the autonomous vehicles within the environment may be used to deliver items ordered by an individual and/or to transport items as part of a request from a member of a community. In addition, in some implementations, as discussed further below, the user need not specifically request transport of items. In contrast, a user may plan a task or activity and the management service 390 will determine the items needed to accomplish the planned task or activity and instruct autonomous vehicles to transport those items to a location of the individual. Such items may include allocated items, community items and/or the purchase, rental, lease, etc., of an unallocated item.

Figure 2:
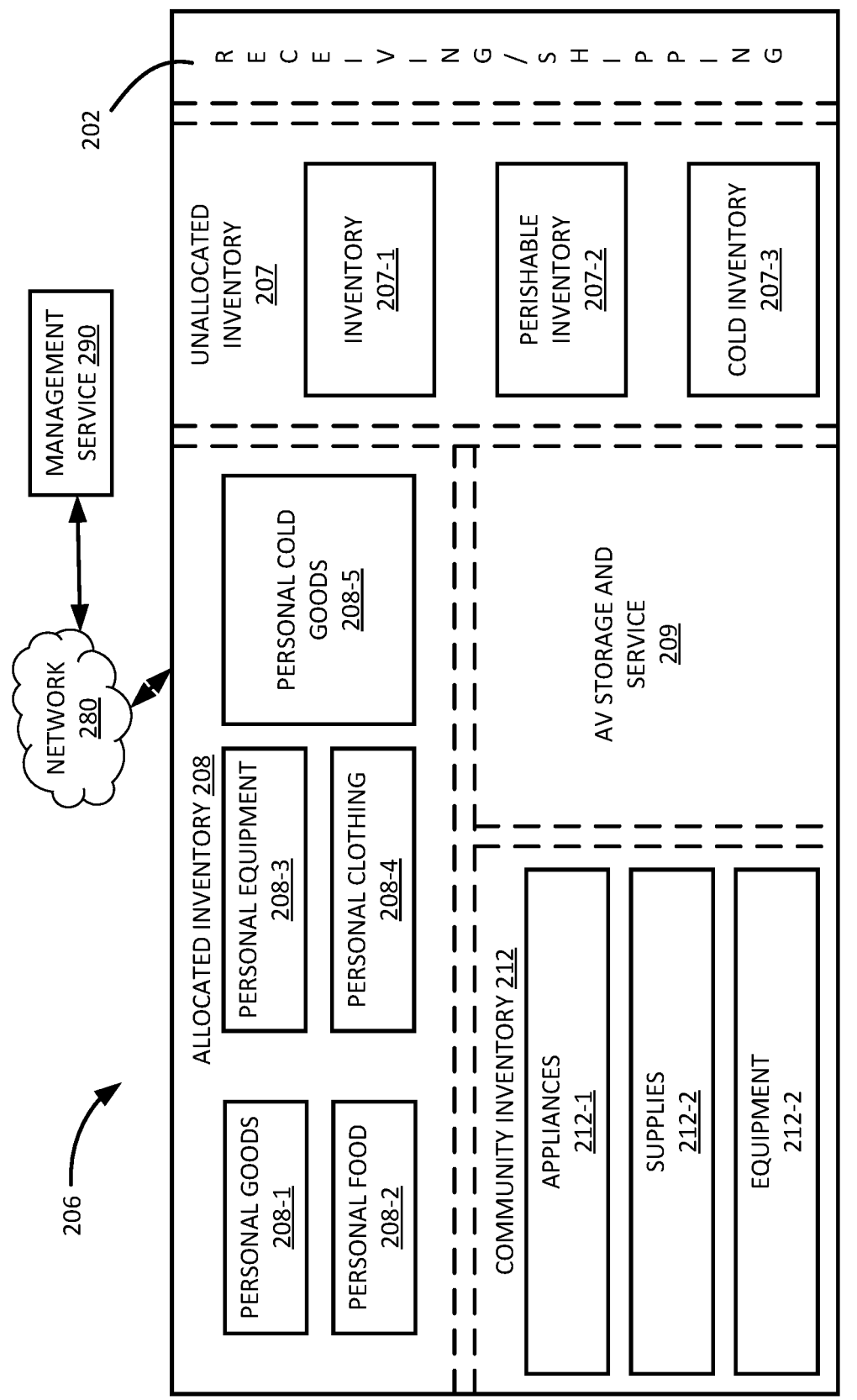
FIG. 2 is a block diagram of a materials handling facility, in accordance with implementations of the present disclosure.

FIG. 2 is a block diagram of a materials handling facility 206, in accordance with implementations of the present disclosure. A materials handling facility, as used herein, may be any type of facility in which one or more items are stored. For example, a materials handling facility may include a traditional fulfillment center, a retail store, a library, etc. In some examples, such as the example illustrated with respect to FIG. 2, a materials handling facility may be configured to store one or more of allocated items, unallocated items, community items and/or to store and service autonomous vehicles.

For example, FIG. 2 illustrates the materials handling facility 206 segmented into a receiving and shipping area 202 where items may be delivered and/or removed from the materials handling facility. Likewise, inventory items may be separated into unallocated inventory 207, allocated inventory 208, and/or community inventory 212. Different inventory areas may be further segmented into different inventory storage areas, depending on the type and/or characteristics to be stored. For example, the unallocated inventory 207 may be segmented into inventory 207-1, perishable inventory 207-2, and cold storage inventory 207-3. Likewise, the allocated inventory may be separated into, for example, personal goods 208-1, personal food 208-2, personal equipment 208-3, personal clothing 208-4, personal cold storage 208-5, etc. Community items may likewise be separated as appliances 212-1, supplies 212-2, equipment 212-3, etc.

In some implementations, the materials handling facility 300 may likewise include an autonomous vehicle storage and service area 209. The autonomous vehicle storage and service area may be configured to store autonomous vehicles when not in use, recharge the power supply of autonomous vehicles, and/or to provide service and maintenance on the autonomous vehicles.

As will be appreciated, additional or few segmentations of inventory may be utilized and those provided are for explanation purposes only. Likewise, while the example illustrated in FIG. 2 shows a physical separation of inventory, in other implementations, inventory of various types may be comingled or separated in other manners.

The materials handling facility may include one or more computing systems that communicate with the management service 210. Communication may be wired and/or wireless. For example, the materials handling facility 206 may communicate with the management service 290 via a network 280, such as the Internet. In other implementations, the management service 290 may be incorporated into or included in the materials handling facility.

Figure 3:
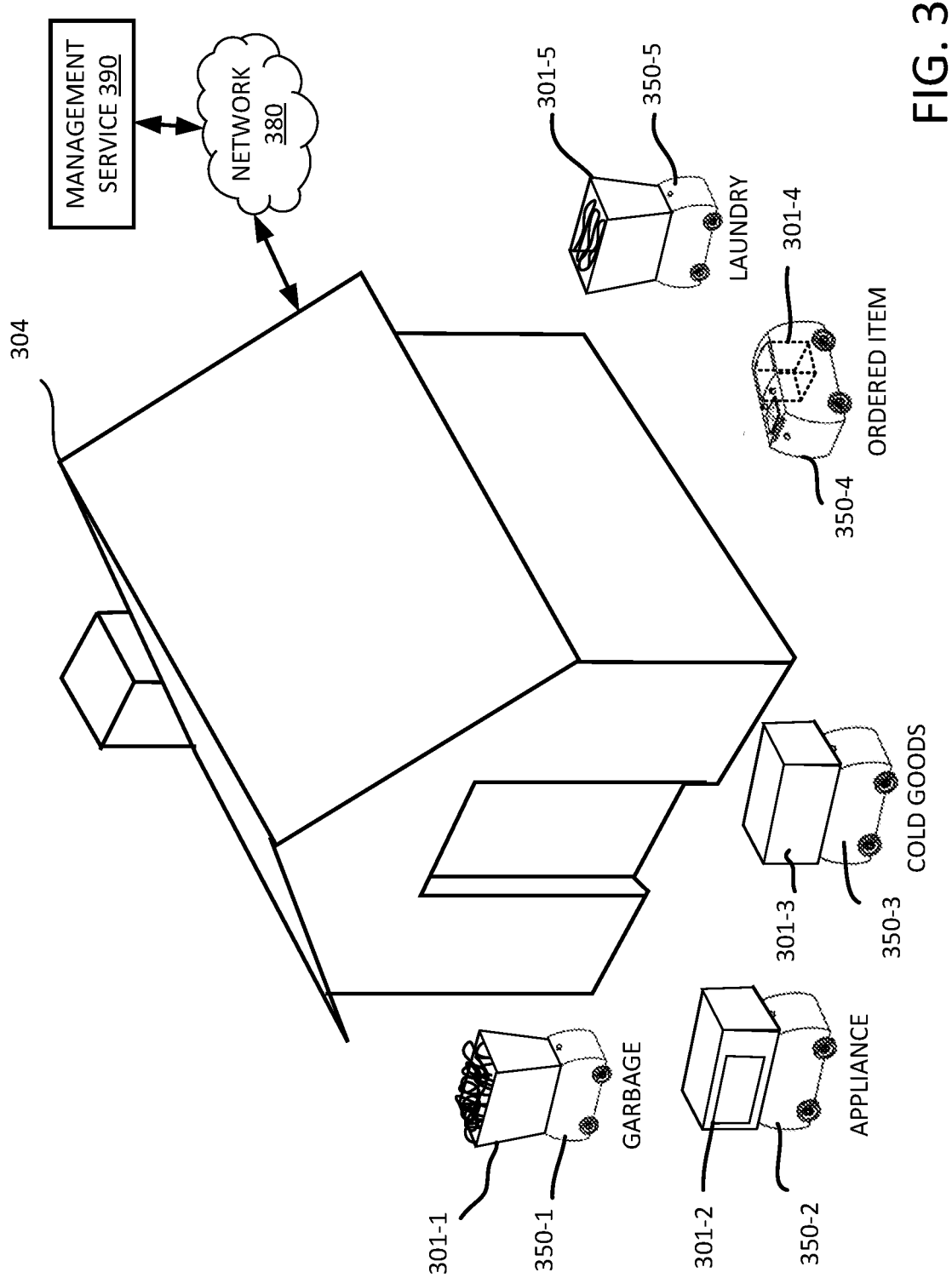
FIG. 3 is a view of a residential location in which multiple autonomous vehicles perform tasks and/or activities in accordance with implementations of the present disclosure.

To further illustrate the implementations discussed herein, a location 304 within a neighborhood community is illustrated in FIG. 3 in which multiple autonomous vehicles perform tasks and/or activities, in accordance with implementations of the present disclosure. As discussed above, a member of the community may request an item be delivered to and/or from the location 304. The request may be transmitted from the location 304, or another location of the member, over the network 380 to the management service 390. The management service then coordinates the movement of the autonomous vehicles 350 to facilitate transport of the item.

In some implementations, recurring tasks or activities may also be managed by the management service 390 and/or performed by one or more autonomous vehicles. Such activities may or may not need input from an individual to be performed. For example, some autonomous vehicles may be configured to perform specific functions and/or activities, such as transporting waste or garbage away from locations, transporting dirty laundry to the cleaners and/or returning clean laundry to locations, delivering items (e.g., community items, allocated items) and/or delivering ordered items. Accordingly, autonomous vehicles may have different sizes, shapes, capabilities, and/or different engagement members for engaging and disengaging payloads.

FIG. 3 illustrates a few example activities or tasks that may be performed with the implementations discussed herein. For example, a first network of one or more autonomous vehicles 350-1 may be configured to transport payloads 301-1 that include waste or garbage away from a location 304. In some implementations, autonomous vehicles that transport payloads that include waste may be owned and/or operated by a service based business that specializes in waste management. For example, the service may provide configured payload 301-1 containers that may be engaged/disengaged by autonomous vehicles without human involvement. The autonomous vehicle may be scheduled to arrive at different locations at different times to either remove a filled payload that includes garbage and/or deliver an empty payload container into which garbage may be placed for later removal. Alternatively, the payload container may be configured to transmit a notification to the management service as the payload container is reaching capacity. In such an implementation, the autonomous vehicles may be routed to retrieve payloads containing waste on an as needed or on-demand basis, rather than scheduled.

As another example, an autonomous vehicle 350-2 may be configured to deliver appliances 301-2 to and/or from a location 304. For example, a user or member of a community may request use of a community appliance 301-2 and the management service 390 will instruct an autonomous vehicle 350-2 that is configured to transport the appliance 301-2 to the location 304 to retrieve the appliance from a materials handling facility, or another location, and transport the item to the location 304.

As still another example, autonomous vehicles 350-3 and 350-4 may be configured to delivery items to the location 304. For example, autonomous vehicle 350-3 may be configured to engage/disengage a payload that can be used to keep items in a temperature controlled environment (e.g., hot or cold). Similarly, autonomous vehicle 350-4 may include an internal storage compartment 301-4 for storing a payload of inventory items. Items delivered by autonomous vehicles to a location may be items already allocated to a member, community items, items purchased, rented, leased, etc., and/or other items.

As another example, autonomous vehicle 350-5 may be configured to engage and/or disengage a payload that is used to store laundry. For example, the autonomous vehicle 350-5 may be operated by a laundry service that retrieves dirty laundry from a location 304 and returns clean laundry to the location 304. As discussed below, the payload that contains dirty laundry may be retrieved at scheduled times and/or when the payload container 301-5 is filled, and/or on-demand when requested by a user or member of the community (e.g., a person living at the location 304). As with the other examples, the management service may send instructions to the autonomous vehicle to navigate to the location 304 and retrieve the payload 301-5 that contains dirty laundry from the location 304, deliver an empty payload to the location 304 into which dirty laundry may be placed, and/or deliver cleaned laundry to the location 304.

While the above examples describe a single management service coordinating movement and control of all autonomous vehicles, in other implementations there may be multiple management services that work in conjunction or independent of other management services to control different autonomous vehicles that are in the same or different communities. For example, a first management service operating on a first sever may communicate with and control a first plurality of autonomous vehicles within the environment and a second management service may communicate with and control a second plurality of autonomous vehicles within the environment. Those management services may likewise communicate to share, among other information, position information relating to various autonomous vehicles, autonomous vehicle capabilities, whether information, navigation path information, etc. In still other implementations, the first management service and the second management service may not communicate.

Figure 4A:
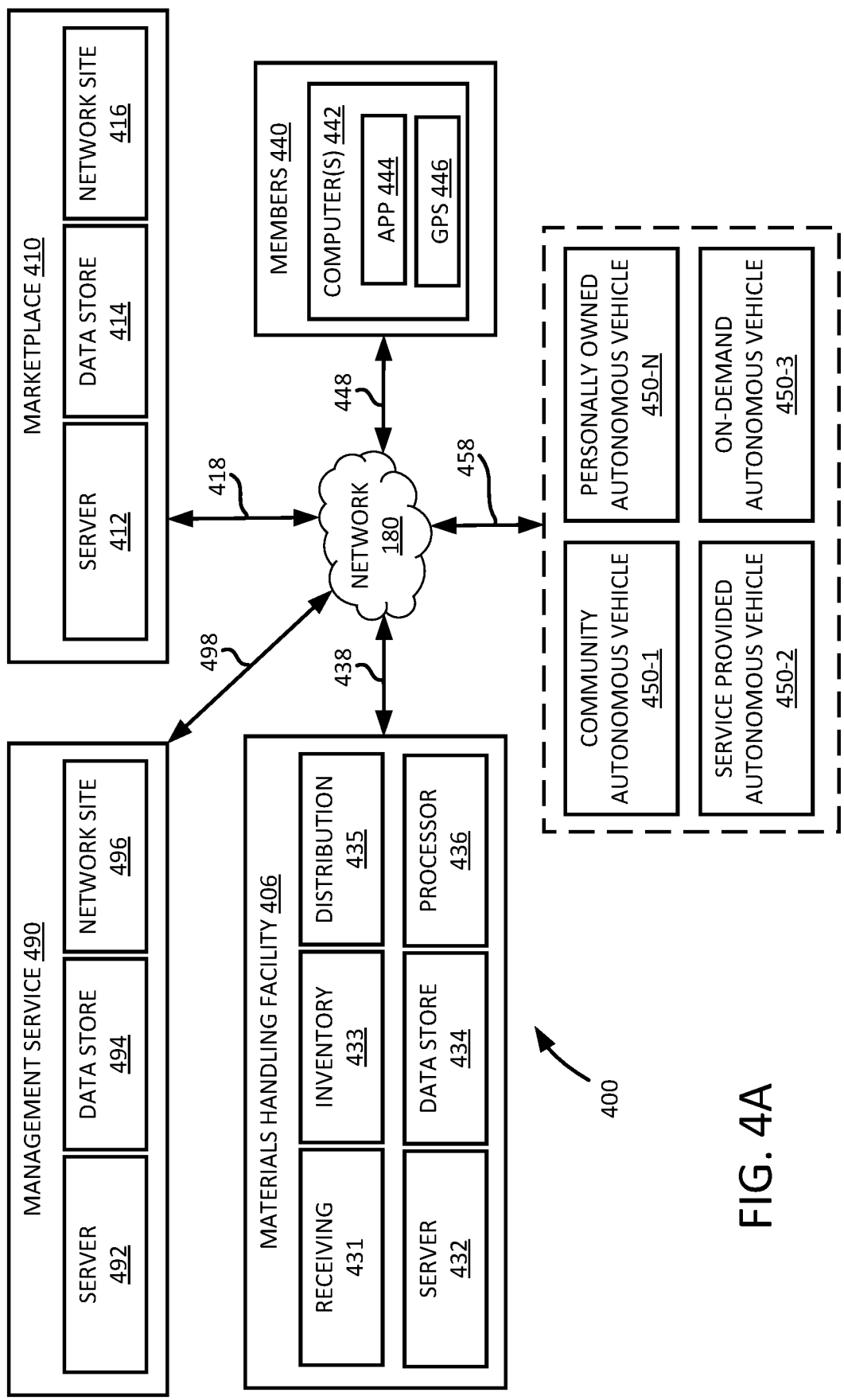
FIGS. 4A and 4B are a block diagram of components of one system, in accordance with implementations of the present disclosure.
Figure 4B:
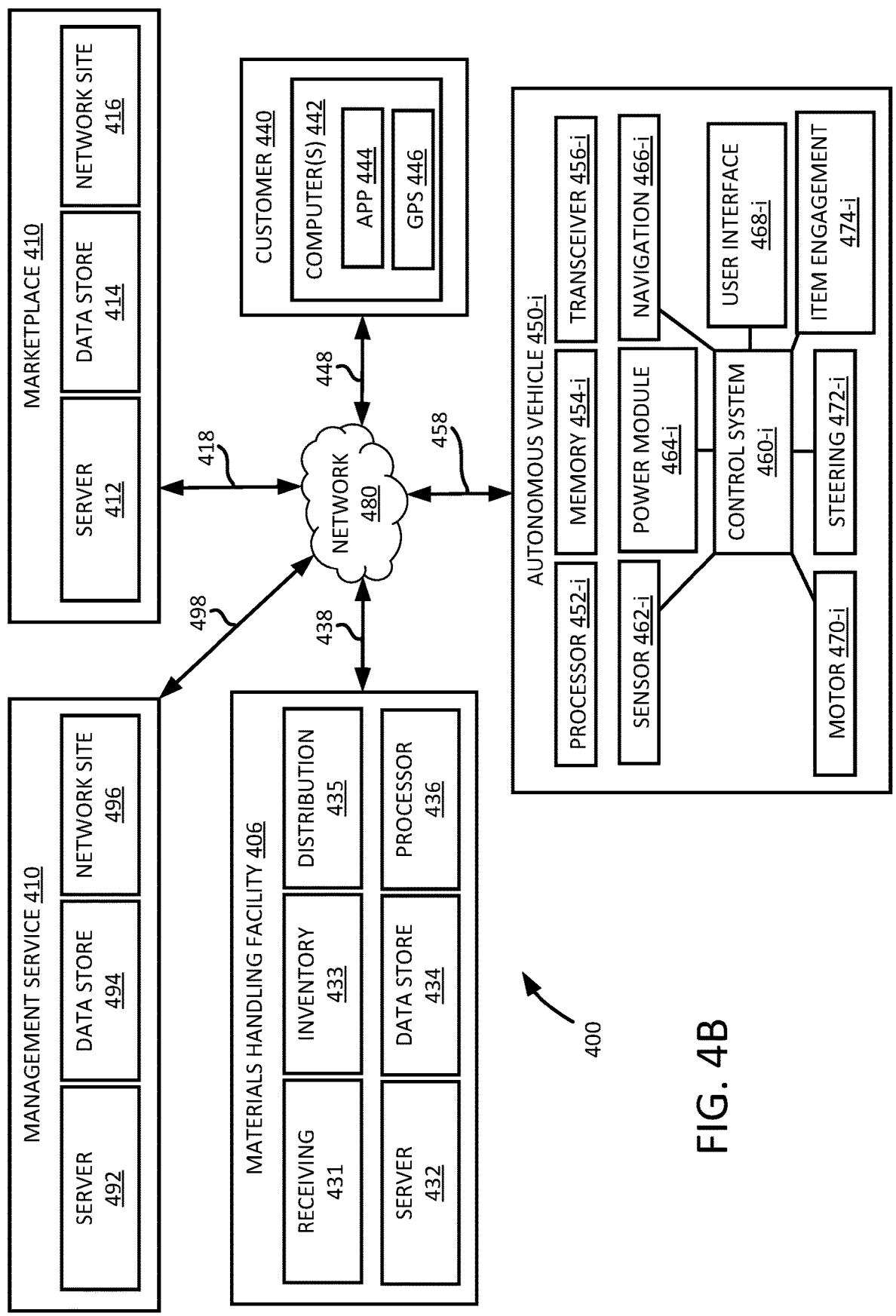

Referring to FIGS. 4A and 4B, a block diagram of components of one system 400, in accordance with implementations of the present disclosure is shown. The system 400 includes a marketplace 410, a materials handling facility 406, a management service 490, community members 440, and a plurality of autonomous vehicles 450-1, 450-2, 450-3 . . . 450-n. Each of the marketplace 410, materials handling facility 406, management service 490, community members 440, plurality of autonomous vehicles 450-1, 450-2, 450-3 . . . 450-n, and the management service 490 are connected to one another across a communications network 480, which may include the Internet in whole or in part.

The marketplace 410 may be any entity or individual that wishes to make items from a variety of sources (e.g., vendors, manufacturers, merchants or sellers) available for download, purchase, rent, lease or borrowing by community members 440 using a networked computer infrastructure, including one or more physical computer servers 412 and data stores 414 (e.g., databases) for hosting a network site 416. The marketplace 410 may be physically or virtually associated with one or more storage or distribution facilities, such as the materials handling facility 406, and/or a retail or commercial location within a community, as discussed above. The network site 416 may be implemented using the one or more servers 412, which connect or otherwise communicate with the one or more data stores 414 as well as the communications network 480, as indicated by line 418, through the sending and receiving of digital data. Moreover, the data store 414 may include any type of information regarding items that have been made available for sale through the marketplace 410, or ordered by community members 440 from the marketplace 410, or any information or data regarding the delivery of such items to the community members, e.g., by one or more of the autonomous vehicles 450-1, 450-2, 450-3 . . . 450-n.

The materials handling facility 406 may be any facility that is adapted to receive, store, process and/or distribute items, including but not limited to allocated items, unallocated items, and/or community items. As is shown in FIG. 4A, the materials handling facility 406 includes a server 432, a data store 434, and one or more computer processors 436. The materials handling facility 406 also includes stations for receiving, storing and distributing items to customers, including but not limited to a receiving station 431, a storage area 433 and a distribution station 435.

The server 432 and/or the processors 436 may operate one or more order processing and/or communication systems and/or software applications having one or more user interfaces, or communicate with one or more other computing devices or machines that may be connected to the communications network 480, as indicated by line 438, to transmit or receive information in the form of digital or analog data, or for any other purpose. For example, the server 432 and/or the processors 436 may also operate or provide access to one or more reporting systems for receiving or displaying information or data regarding requests for items received by the management service 490, or deliveries made by one or more of the autonomous vehicles 450-1, 450-2, 450-3 . . . 450-n, and may provide one or more interfaces for receiving interactions (e.g., text, numeric entries or selections) from one or more operators, users, workers or other persons in response to such information or data. The server 432, the data store 434 and/or the processor 436 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

The receiving station 431 may include any apparatuses that may be required in order to receive shipments of items at the materials handling facility 406 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), autonomous vehicles, such as AGVs, and preparing such items for storage or distribution. The storage area 433 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 435 may include one or more regions or stations where items that have been retrieved from a designated storage area may be evaluated, prepared and packed for delivery from the materials handling facility 406 to addresses, locations or destinations specified by community members, e.g., by way of one or more of the autonomous vehicles 450-1, 450-2, 450-3 . . . 450-n, as well as carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 431 may be processed, and the items placed into storage within the storage areas 433 or, alternatively, transferred directly to the distribution station 435, or "cross-docked," for prompt delivery to one or more customers.

The materials handling facility 406 may further include one or more control systems that may generate instructions for conducting operations at one or more of the receiving station 431, the storage area 433 or the distribution station 435. Such control systems may be associated with the server 432, the data store 434 and/or the processor 436, or with one or more other computing devices or machines, and may communicate with the receiving station 431, the storage area 433 or the distribution station 435 within the materials handling facility 406 by any known wired or wireless means, or with the marketplace 410, the community members 440 or one or more of the autonomous vehicles 450-1, 450-2, 450-3 . . . 450-n over the communications network 480, as indicated by line 438, through the sending and receiving of digital data.

Additionally, the materials handling facility 406 may include one or more systems or devices for determining locations of one or more elements therein, such as cameras or other image recording devices. Furthermore, the materials handling facility 406 may also include one or more workers or staff members, who may handle or transport items within the materials handling facility 406. Such workers may operate one or more computing devices or machines for registering the receipt, retrieval, transportation or storage of items within the materials handling facility, or a general-purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The community members 440 may be any entity or individual that wishes to download, purchase, rent, lease, borrow or otherwise retrieve or return items (which may include goods, products, allocated items, unallocated items, and/or community items) from the marketplace 410, other community members, a materials handling facility, etc., by means of one or more autonomous vehicles 450-1, 450-2, 450-3 . . . 450-n. The community member 440 may utilize one or more computing devices 442 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 444, such as a web browser or a shopping application, and may be connected to or otherwise communicate with the marketplace 410, the materials handling facility 406 or the autonomous vehicles 450-1, 450-2, 450-3 . . . 450-n through the communications network 480, as indicated by line 448, by the transmission and receipt of digital data. The computing devices 442 may also include a location determining component, such as a GPS receiver 446 that can be used to determine and provide position information with respect to the device and/or the community member 440.

The autonomous vehicles 450-1, 450-2, 450-3 . . . 450-n may be any type or form of self-powered vehicle capable of being programmed or otherwise configured for autonomous travel between two points of a navigation path, in furtherance of the performance of one or more missions or tasks, such as the delivery of an item from the materials handling facility 406 to the community member 440, etc., based on one or more computer instructions. Each of the autonomous vehicles 450-1, 450-2, 450-3 . . . 450-*n* shown in FIG. 4A, which are represented in FIG. 4B as an autonomous vehicle 450-*i*, may include one or more computer components such as a processor 452-*i*, a memory 454-*i* and a transceiver 456-*i* in communication with one or more other computer devices that may be connected to the communications network 480, as indicated by line 458, in order to transmit or receive information in the form of digital or analog data, or for any other purpose. For example, the autonomous vehicle 450-*i* may receive instructions or other information or data via the transceiver 456-*i* regarding an item that is to be delivered from the materials handling facility 406 to the community member 440. The transceiver 456-*i* may be configured to enable the automated vehicle 450-*i* to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the communications network 480 or directly.

The transceiver 456-*i* may further include or be in communication with one or more input/output (or "I/O") interfaces, network interfaces and/or input/output devices, and may be configured to allow information or data to be exchanged between one or more of the sensors or other components of the autonomous vehicle 450-*i*, or to one or more other computer devices or systems (e.g., aerial vehicles, other autonomous vehicles) via the communications network 480. For example, in some implementations, the transceiver 456-*i* may be configured to coordinate I/O traffic between the processor 452-*i* and one or more onboard or external computer devices or components. The transceiver 456-*i* may perform any necessary protocol, timing or other data transformations to convert data signals from a first format suitable for use by one component into a second format suitable for use by another component. In some implementations, the transceiver 456-*i* may include support for components attached through various types of peripheral buses, e.g., variants of the Peripheral Component Interconnect (PCI) bus standard or the Universal Serial Bus (USB) standard. In some other implementations, functions of the transceiver 456-*i* may be split into two or more separate components, or incorporated directly into the processor 452-*i*.

As is also shown in FIG. 4B, the autonomous vehicle 450-*i* further includes one or more control systems 460-*i*, as well as one or more sensors 462-*i*, one or more power modules 464-*i*, one or more navigation modules 466-*i*, and one or more user interfaces 468-*i*. Additionally, the autonomous vehicle 450-*i* further includes one or more motors 470-*i*, one or more steering systems 472-*i* and one or more item engagement systems (or devices) 474-*i*.

The control system 460-*i* may include one or more software applications or hardware components configured for controlling or monitoring operations of one or more components such as the sensor 462-*i*, the power module 464-*i*, the navigation module 466-*i*, or the user interfaces 468-*i*, as well as the motors 470-*i*, the steering systems 472-*i* and the item engagement systems 474-*i*, e.g., by receiving, generating, storing and/or transmitting one or more computer instructions to such components. The control system 460-*i* may communicate with the management service 490, the marketplace 410, the materials handling facility 406 and/or the community member 440 over the communications network 480, as indicated by line 458-*i*, through the sending and receiving of digital data.

The sensor 462-*i* may be a position sensor such as a GPS receiver in communication with one or more orbiting satellites or other components of a GPS system, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data), of the autonomous vehicle 450-*i*. Geolocations of the sensor 462-*i* may be associated with the autonomous vehicle 450-*i*, where appropriate.

The sensor 462-*i* may also be an imaging device including any form of optical recording sensor or device (e.g., digital cameras, depth sensors or range cameras, infrared cameras, radiographic cameras, thermographic cameras, and/or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the autonomous vehicle 450-*i*. For example, the sensor 462-*i* may be configured to capture or detect reflected light if the reflected light is within a field of view of the sensor 462-*i*, which is defined as a function of a distance between an imaging sensor and a lens within the sensor 462-*i*, viz., a focal length, as well as a location of the sensor 462-*i* and an angular orientation of the lens. Accordingly, where an object appears within a depth of field, or a distance within the field of view where the clarity and focus is sufficiently sharp, the sensor 462-*i* may capture light that is reflected off objects of any kind to a sufficiently high degree of resolution using one or more sensors thereof, and store information regarding the reflected light in one or more data files and/or transmit the data over the network 480 to the management service 490.

The sensor 462-*i* may also include manual or automatic features for modifying a field of view or orientation. For example, the sensor 462-*i* may be a digital camera configured in a fixed position, or with a fixed focal length (e.g., fixed-focus lenses) or angular orientation. Alternatively, the sensor 462-*i* may include one or more actuated or motorized features for adjusting a position of the sensor 462-*i*, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 462-*i*, or a change in one or more of the angles defining the angular orientation of the sensor 462-*i*.

For example, the sensor 462-*i* may be an imaging device that is hard-mounted to a support or mounting that maintains the imaging device in a fixed configuration or angle with respect to one, two or three axes. Alternatively, however, the sensor 462-*i* may be provided with one or more motors and/or controllers for manually or automatically operating one or more of the components, or for reorienting the axis or direction of the sensor 462-*i*, i.e., by panning or tilting the sensor 462-*i*. Panning the sensor 462-*i* may cause a rotation within a horizontal plane or about a vertical axis (e.g., a yaw), while tilting the sensor 462-*i* may cause a rotation within a vertical plane or about a horizontal axis (e.g., a pitch). Additionally, the sensor 462-*i* may be rolled, or rotated about its axis of rotation, and within a plane that is perpendicular to the axis of rotation and substantially parallel to a field of view of the sensor 462-*i*.

Imaging data (e.g., still or moving images, as well as associated audio data or metadata) captured using the sensor 462-*i* may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 462-*i* may further be one or more compasses, speedometers, altimeters, thermometers, barometers, hygrometers, gyroscopes, air monitoring sensors (e.g., oxygen, ozone, hydrogen, carbon monoxide or carbon dioxide sensors), artificial olfaction device (also known as an electronic nose or e-nose) to detect smells and/or chemicals, ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors), sound sensors (e.g., microphones, piezoelectric sensors, vibration sensors or other transducers for detecting and recording acoustic energy from one or more directions), distance detection sensors (e.g., light detection and ranging (LIDAR), sound navigation and ranging (SONAR), radio detection and ranging (RADAR)), etc.

The sensor 462-*i* may also be an item identification sensor, including a bar code scanner, a radiofrequency identification (or RFID) reader, or other technology that is utilized to determine an identification of an item that is being retrieved or deposited, or has been retrieved or deposited, by the autonomous vehicle 450-*i*. In some implementations, the sensor 462-*i* may be provided within a cargo bay or other storage component of the autonomous vehicle 450-*i*, such as a presence detection sensor and/or a motion sensor for detecting the presence or absence of one or more objects within the cargo bay or storage compartment, or movement of objects therein.

The sensor 462-*i* may be further configured to capture, record and/or analyze information or data regarding its positions, velocities, accelerations or orientations of the autonomous vehicle 450-*i*, and to analyze such data or information by one or more means, e.g., by aggregating or summing such data or information to form one or more qualitative or quantitative metrics of the movement of the sensor 262-*i*. For example, a net vector indicative of any and all relevant movements of the autonomous vehicle 450-*i*, including but not limited to physical positions, velocities, accelerations or orientations of the sensor 462-*i*, may be derived. Additionally, coefficients or scalars indicative of the relative movements of the autonomous vehicle 450-*i* and/or objects around the autonomous vehicle 450-*i*, may also be defined.

The power module 464-*i* may be any type of power source for providing electrical power, mechanical power or other forms of power in support of one or more electrical or mechanical loads aboard the autonomous vehicle 450-*i*. In some implementations, the power module 464-*i* may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 464-*i* may each have any cell voltages, peak load currents, charge times, specific energies, internal resistances or cycle lives, or other power ratings. The power module 464-*i* may also be any type, size or form of other power source, e.g., other than a battery, including but not limited to or more fuel cells, turbines, solar cells or nuclear reactors. Alternatively, the power module 464-*i* may be another form of prime mover (e.g., electric, gasoline-powered or any other type of motor) capable of generating sufficient mechanical forces for the autonomous vehicle 450-*i*.

The navigation module 466-*i* may include one or more software applications or hardware components including or having access to information or data regarding aspects of navigation paths, including the locations, dimensions, capacities, conditions, statuses or other attributes of the paths. For example, the navigation module 466-*i* may receive inputs from the sensor 462-*i*, e.g., from a GPS receiver, an imaging device or another sensor, and determine a direction and/or a speed of the autonomous vehicle 450-*i* for travelling on a given path based on such inputs. The navigation module 466-*i* may select a path to be traveled upon by the autonomous vehicle 450-*i*, and may provide information or data regarding the selected path to the control system 460-*i*.

The user interface 468-*i* may be configured to receive and provide information to human users (subscribers, non-subscribers) of the autonomous vehicle 450-*i* and may include, but is not limited to, a display, (e.g., a touch-screen display), a projector, a scanner, a keypad, a braille keypad, a biometric scanner, an audio transducer, one or more speakers, one or more microphones, one or more imaging devices such as a video camera, and any other types of input or output devices that may support interaction between the autonomous vehicle 450-*i* and a human user. In various implementations, the user interface 468-*i* may include a variety of different features. For example, in one implementation, the user interface 468-*i* may include a relatively small display and/or a keypad for receiving inputs from human users. In other implementations, inputs for controlling the operation of the autonomous vehicle 450-*i* may be provided remotely. For example, to access a storage compartment, a human user may send a text message to or reply to a text message from the control system 460-*i* and request that a door or other access portal be opened to enable the user to access an item therein. As another example, a user may interact with a user interface of an autonomous vehicle and/or by sending a text message or other communication, to cause the autonomous vehicle to disengage a payload. In various implementations, the autonomous vehicle 450-*i* may have capabilities for directly receiving such signals from a user device or other device (e.g., a device inside a user's residence). In other implementations, the request from the user may be transmitted to the management service 490 and the management service may send instructions to the automated vehicle 450-*i* for execution.

The motor 470-*i* may be any type or form of motor or engine (e.g., electric, gasoline-powered or any other type of motor) that is capable of providing sufficient rotational forces to one or more axles, shafts and/or wheels for causing the autonomous vehicle 450-*i* and any items therein to travel in a desired direction and at a desired speed. In some implementations, the autonomous vehicle 450-*i* may include one or more electric motors having any number of stators, poles and/or windings, such as an outrunner or an inrunner brushless direct current (DC) motor, or any other motors, having any speed rating, power rating or any other rating.

The steering system 472-*i* may be any system for controlling a direction of travel of the autonomous vehicle 450-*i*. The steering system 472-*i* may include any number of automatically operable gears (e.g., racks and pinions), gear boxes, shafts, shaft assemblies, joints, servos, hydraulic cylinders, linkages or other features for repositioning one or more wheels to cause the autonomous vehicle 450-*i* to travel in a desired direction.

The item engagement system 474-*i* may be any mechanical component, e.g., a robotic arm, for engaging an item or for disengaging the item, as desired. For example, when the autonomous vehicle 450-*i* is tasked with delivering an item from a source location to a destination location, the item engagement system 474-*i* may be used to engage the item at the source location and to deposit the item in a cargo bay or another storage compartment prior to departing. After the autonomous vehicle 450-*i* arrives at the destination location, the item engagement system 474-*i* may be used to retrieve the item within the cargo bay or storage compartment, and deposit the item in a desired location at the destination.

Any combination of networks or communications protocols may be utilized in accordance with the systems and methods of the present disclosure. For example, each of the automated vehicles 450-1, 450-2, 450-3 . . . 450-*n* may be configured to communicate with one another, the management service 490, with the marketplace server 412, the materials handling facility server 432 and/or the devices 442 via the communications network 480, such as is shown in FIGS. 4A and 4B, e.g., via an open or standard protocol such as Wi-Fi. Alternatively, each of the autonomous vehicles 450-1, 450-2, 450-3 . . . 450-*n* may be configured to communicate with one another directly outside of a centralized network, such as the communications network 480, e.g., by a wireless protocol such as Bluetooth, in which two or more of the autonomous vehicles 450-1, 450-2, 450-3 . . . 450-*n* may be paired with one another.

In some implementations, autonomous vehicles within a defined distance (e.g., within a community) may wirelessly connect and/or provide wireless access points (aka, hotspots) to persons in the area of the autonomous vehicles. For example, a plurality of autonomous vehicles may wireless connect and allow connections from other devices (e.g., smartphones, laptops, tablets, reading devices, etc.) to provide network connectivity for those devices through the autonomous vehicles. Using such a configuration, persons in the area can obtain digital content from the autonomous vehicle, access the Internet, etc. Likewise, in some examples, the wireless network formed by the autonomous vehicles may be utilized to securely access and/or communicate with the autonomous vehicles. For example, a community member may utilize a device, such as a smartphone, that is wirelessly connected to one or more autonomous vehicles to, for example, order items from the autonomous vehicle, etc.

The management service 490 includes one or more physical computer servers 492 having a plurality of databases 494 associated therewith, as well as one or more computer processors 496 provided for any specific or general purpose. The servers 492 may be connected to or otherwise communicate with the databases 494 and the processors 496. The databases 494 may store any type of information or data, including but not limited to acoustic signals, information or data relating to acoustic signals, or information or data regarding community members, and/or their attributes, interests or preferences, for any purpose. The servers 492 and/or the computer processors 496 may also connect to or otherwise communicate with the communications network 480, as indicated by line 498, through the sending and receiving of digital data. For example, the management service 490 may include any facilities, stations or locations having the ability or capacity to receive and store information or data in one or more data stores, e.g., data files received from any of the autonomous vehicles 450-1, 450-2, 450-3 . . . 450-*n*, and/or one or more other external computer systems via the communications network 480. In some implementations, the management service 490 may be provided in a physical location. In other such implementations, the data management service 490 may be provided in one or more alternate or virtual locations, e.g., in a "cloud"-based environment. In still other implementations, the management service 490 may be provided onboard one or more of the autonomous vehicles 450-1, 450-2, 450-3 . . . 450-*n*.

For example, the management service 490 of FIG. 4A may be independently provided for the purpose of defining navigation paths having a plurality of points based on attributes of a given mission or task, attributes of one or more of the autonomous vehicles 450-1, 450-2, 450-3 . . . 450-*n*, or attributes of physical and/or geographic features within a given environment, including but not limited to locations, dimensions, lighting, or other attributes of roads, sidewalks, crosswalks, bicycle or walking paths, bridges or trails, or non-traditional transportation infrastructure, such as parks, fields, forests, lots, clearings or other spaces. The number and/or type of physical and/or geographic features that may be evaluated and considered for inclusion in a navigation path by the management service 490, and the number and/or type of points that may be included in such a navigation path, are not limited.

In some implementations, the management service 490 of FIG. 4A may also be provided for the purpose of receiving, tracking and/or otherwise monitoring the operations of one or more of the autonomous vehicles 450-1, 450-2, 450-3 . . . 450-*n*, including but not limited to any information or data regarding attributes of the autonomous vehicles 450-1, 450-2, 450-3 . . . 450-*n*, or missions or tasks being performed by the autonomous vehicles 450-1, 450-2, 450-3 . . . 450-*n*, as well as environmental conditions, traffic conditions, ground or surface conditions, weather conditions, planned or ongoing construction or other events, or any other factors that may affect the capacity of one or more paths within an environment and/or the security or health of one or more subscribers within a safety area.

For example, the management service 490 may receive information or data regarding a mission or task to be performed, e.g., a delivery of an item from an origin to a destination, and may identify a plurality of routes between two or more points within the environment, and may select one or more of such paths for the execution of the mission or task by one or more of the autonomous vehicles 450-1, 450-2, 450-3 . . . 450-*n*. The management service 490 may further provide instructions to one or more of the autonomous vehicles 450-1, 450-2, 450-3 . . . 450-*n*, indicating a route to be traveled between two or more points, including times and dates at which an autonomous vehicle has arrived at or departed from one or more of such points. The management service 490 may be further configured to receive information or data regarding changes to any of the attributes regarding a given mission or task, changes to any of the attributes of any of the autonomous vehicles 450-1, 450-2, 450-3 . . . 450-*n*, updates to a path being navigated, or changes to any of the attributes of the physical and/or geographic features of the environment. Information or data regarding such changes may be received from any intrinsic or extrinsic sources, including but not limited to one or more networked computer systems, e.g., over the communications network 480, or from one or more of the autonomous vehicles 450-1, 450-2, 450-3 . . . 450-*n*. For example, the management service 490 may include information or data such as a speed, a course, a position (e.g., a latitude and a longitude), an elevation, an angle of orientation (e.g., a yaw, a pitch or a roll) of an autonomous vehicle, as well as information or data regarding environmental or surface conditions, traffic conditions, lighting, congestion or any other relevant factors regarding a given path.

The management service 490 may also be configured to determine whether a route being traveled by one or more of the autonomous vehicles 450-1, 450-2, 450-3 . . . 450-*n* remains optimal or preferred for a given autonomous vehicle and/or task, or to communicate instructions for varying the route. The number and/or type of information or data that may be received and/or processed or utilized by the management service 490 are not limited.

Those of ordinary skill in the pertinent arts will understand that process steps described herein as being performed by a "marketplace," a "materials handling facility" a "community member," an "autonomous vehicle," a "management service" or like terms, may be automated steps performed by their respective computer systems, or implemented within software modules (or computer programs) executed by one or more general purpose computers. Moreover, process steps described as being performed by a "marketplace," a "materials handling facility," a "community member," an "autonomous vehicle" or a "management service" may be typically performed by a human operator, but could, alternatively, be performed by an automated agent.

The marketplace 410, the materials handling facility 406, the community member 440, the autonomous vehicles 450-1, 450-2, 450-3 . . . 450-*n*, and/or the management service 490 may use any web-enabled or Internet applications or features, or any other client-server applications or features including electronic mail (or E-mail), or other messaging techniques, to connect to the communications network 480 or to communicate with one another, such as through short or multimedia messaging service (SMS or MMS) text messages. For example, the materials handling facility 406 and/or the server 432 may be adapted to transmit information or data in the form of synchronous or asynchronous messages to the marketplace 410 and/or the server 412, the community member 440 and/or the computing device 442, the autonomous vehicles 450-1, 450-2, 450-3 . . . 450-*n* and/or the control system 460-*i* or the management service 490, or any other computer device in real time or in near-real time, or in one or more offline processes, via the communications network 480. Those of ordinary skill in the pertinent art would recognize that the marketplace 410, the materials handling facility 406, the community member 440, the autonomous vehicles 450-1, 450-2, 450-3 . . . 450-*n* and/or the management service 490 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 412, 432, 492, the computing devices 442, the processors 452-*i*, 496, or any other computers or control systems utilized by the marketplace 410, the materials handling facility 406, the community member 440, the autonomous vehicles 450-1, 450-2, 450-3 . . . 450-*n*, the management service 490, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, autonomous vehicles traveling throughout an environment may remain in communication with a management service, other autonomous vehicle, and/or other networked computer systems. The autonomous vehicles may transmit information or data (e.g., imaging data of any type or form) regarding their past, present or future operations and/or environmental surroundings to the management service, e.g., their respective speeds, courses, positions (e.g., latitudes and longitudes), elevations or angles of orientation (e.g., yaws, pitches or rolls), environmental or surface conditions, traffic conditions, congestion or any other relevant factors encountered by the autonomous vehicles to the management service or other networked computer systems, as well as images and/or audio of the environment in which the autonomous vehicle is operating.

Figure 5A:
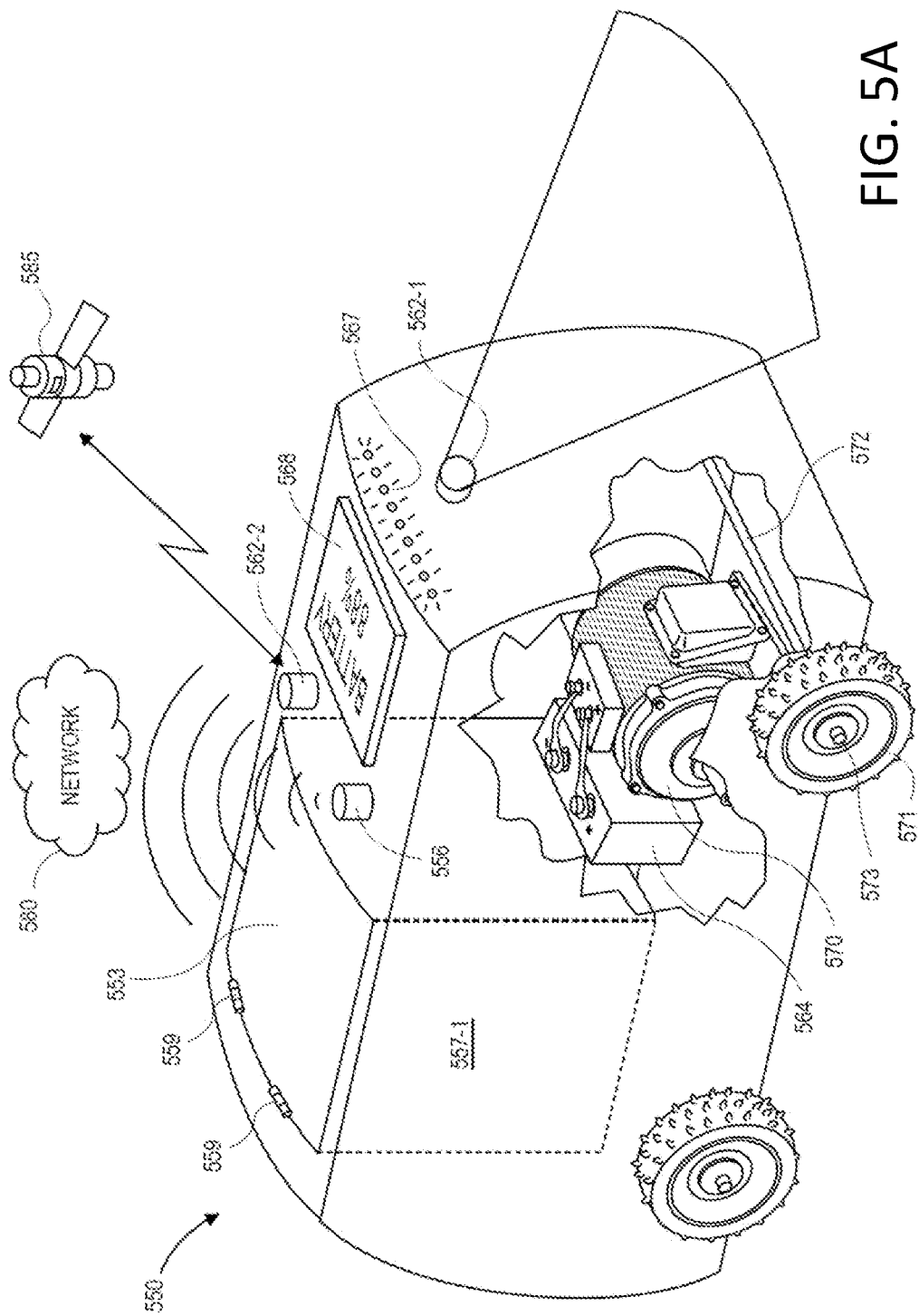
FIG. 5A-5B are views of autonomous vehicles, in accordance with implementations of the present disclosure.

FIG. 5A illustrates a view of one autonomous vehicle 550 configured for ground based travel, in accordance with implementations of the present disclosure. As is shown in FIG. 5A, the autonomous vehicle 550 includes a frame 552, a storage compartment 557, a pair of axles 573 and a plurality of wheels 571 joined to the axles 573. A front surface of the frame 552 includes an imaging device 562-1 having a field of view aligned in a forward direction or orientation with respect to the autonomous vehicle 550 and an array of lights 567. As will be appreciated, the autonomous vehicle 550 may include any number of imaging devices 562-1, with fields of view that may be permanently or adjustably aligned in any direction or orientation with respect to the autonomous vehicle 550. In some implementations, the autonomous vehicle 550 may include any number of lights, on any surface thereof, and one or more of the lights may include light emitting diodes (LEDs) or other light sources. The autonomous vehicle 550 may also include one or more speakers 562-3 and/or one or more microphones 562-4 positioned about the frame of the autonomous vehicle 550.

As illustrated in FIG. 5A, an upper surface of the frame 552 may include a door 553 providing access to the storage compartment 557 that is rotatably connected by a pair of hinges 559. The door 553 may include any number of manual or automatic features for causing the opening or closing thereof, and may include any suitable dimensions with respect to the dimensions of the storage compartment 557. In some implementations, the autonomous vehicle 550 may include doors 553 on any surface thereof, and any number of storage compartments 557 of any size or shape.

Figure 5B:
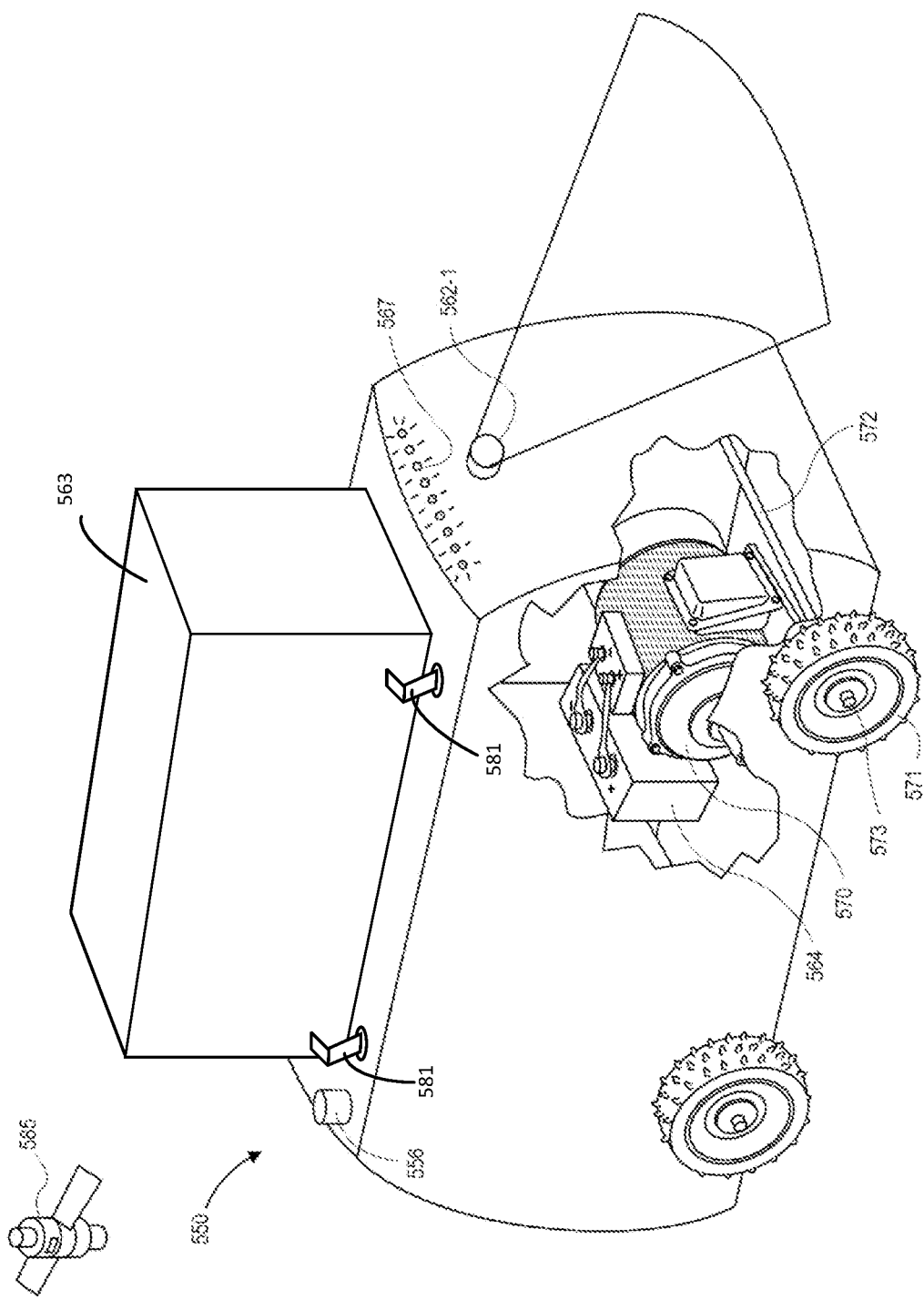

In other implementations, as illustrated in FIG. 5B, rather than or in addition to an internal storage compartment 557, the autonomous vehicle 550 may be configured to selectively engage and/or disengage a payload 563. For example, the autonomous vehicle may include a plurality of engagement members 581 that may be moved between an engagement position in which the payload is engaged by the engagement members 581 and secured to the autonomous vehicle and a disengagement position in which the payload 563 may be removed from the autonomous vehicle. While the example illustrated with respect to FIG. 5B illustrates the payload and engagement member on the upper side or top of the autonomous vehicle, in other implementations, the payload engagement members 581 may be positioned elsewhere on the autonomous vehicle to engage and disengage payloads.

The upper surface of the frame 552 further includes a transceiver 556 (e.g., a Wi-Fi transmitter and receiver) for communicating with a network 580, which may include the Internet in whole or in part, as well as a GPS receiver 562-2, which may receive geolocation data from or transmit geolocation data to a GPS network 585. The upper surface of the frame 552 further includes a user interface 568 which may receive interactions from a human user, or display information to the human user, as appropriate. In some implementations, the GPS receiver 562-2, and/or the user interface 568 may be provided on any other surface of the frame 552.

As is shown in FIG. 5A, the autonomous vehicle 550 may include a power module 564 (e.g., a battery), a motor 570 (e.g., a DC electric motor operating at twelve to forty-eight volts) and a steering component 572 (e.g., one or more racks or pinions for automatically changing a direction of travel of the autonomous vehicle 550 and/or an orientation of one or more of axles 573 or the wheels 571. The motor 570 may be configured to operate at any speed or have any power rating, and to cause the autonomous vehicle 550 to travel in a forward direction of travel, a reverse direction of travel or in any other direction of travel as determined by the steering component 572. Additionally, the axles 573 and wheels 571 of the autonomous vehicle 550 may also have any dimension. For example, the wheels 571 may have bores or axle pads for accommodating axles 573 of any diameter or thickness, and any number of spokes or other extensions for supporting a rim having any desired spacings or offsets for accommodating tires or other coverings. Each of the axles 573 may be joined to and configured to rotate any number of wheels 571, which may include tires or other coverings of any suitable material, including but not limited to rubbers and/or plastics. The wheels 571 or tires thereon may feature any number of belts, walls, treads or other components, and may be pneumatic or solid, or take any other form.

Figure 6:
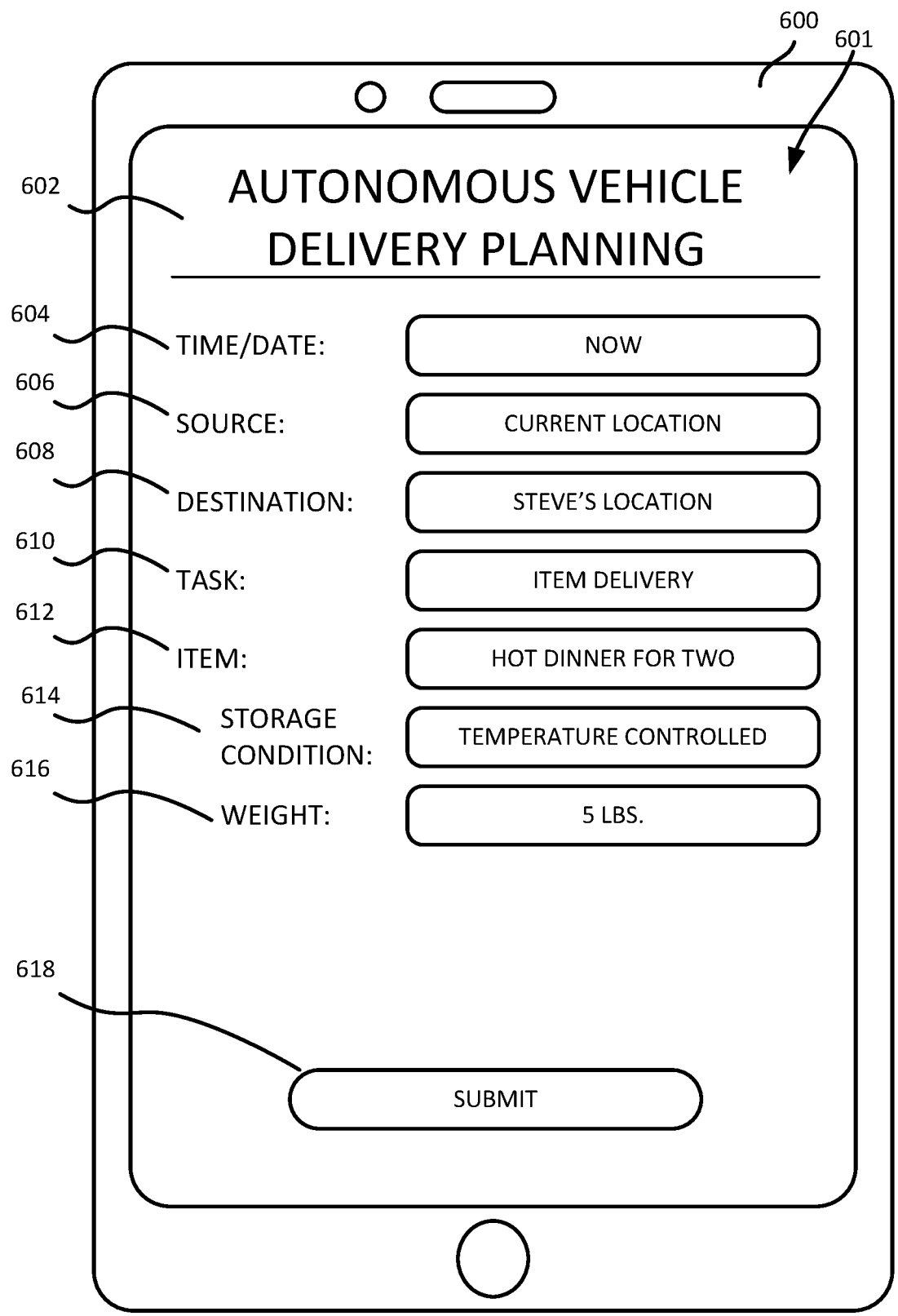
FIG. 6 illustrates a user interface for autonomous vehicle item delivery planning, in accordance with implementations of the present disclosure.

FIG. 6 illustrates a user interface 601 for autonomous vehicle item delivery planning presented on a display of a user device 600, in accordance with implementations of the present disclosure. The user interface 601 may be presented by a software application executing on the user device 600 and/or presented as a web interface, etc.

In the illustrated example, the user interface is presenting information relating to autonomous vehicle delivery planning that may be used by a community member to submit a request to the management service for an autonomous vehicle to transport an item from a source location to a destination location. In submitting a request, a user may provide one or more characteristics or parameters relating to the request. For example, a user may indicate a time and/or date 604 at which the item is to be retrieved from a source location for transport and/or delivered to a destination location. In the current example, the user has selected "Now" as the time/date at which the item is to be retrieved from the source location for transport.

In some implementations, a user may also specify a source location 606 from which the item is to be retrieved for transport. The source location may be an input location and/or an address or, as illustrated in FIG. 6, the current location of the user device 600. When the source location is indicated as the current location of the user device, the source location may be updated as the user and/or the user device move. For example, the client device may periodically transmit position information (e.g., GPS information) and that position information may be utilized as the destination location.

Similar to specifying a source location, a user may also specify a destination location 608. The destination location 608 may be input as a physical location or address or specified as a current location of another client device. In the present example, the user has specified the destination 608 as the location of the client device associated with another user named Steve. For example, the management service may maintain information regarding different community members and a first community member may select a second community member as a destination location for delivery of an item. When the destination location is indicated as the current location of another user device, the destination location may be updated as the user and/or the client device move. For example, the client device may periodically transmit position information (e.g., GPS information) and that position information may be utilized as the destination location.

In addition to specifying the delivery timeframe, the source location, and the destination location, the user interface 601 may also be utilized to specify the task 610 to be performed, such as item delivery or item retrieval, and/or information regarding the item 612 to be transported. In the present example, the item to be transported from the current location of the user requesting the item transport to the current location of a second user, Steve, is identified as a "Hot dinner for two" and the user has further specified that the item is to be transported in a temperature controlled environment, as indicated by the storage condition 614. Finally, the user has specified an approximate weight 616 of the item to be transported, in this example five pounds.

Once the user has provided all the parameters for the item transport, the user may select the submit control 618 to submit the request for item transport to the management service. The application executing on the user device 600 that presented the user interface transmits the request to the management service and/or that information may be submitted via a web interface, etc.

As will be appreciated, the example user interface 601 is only one example interface that may be utilized to submit a request for an autonomous vehicle transport of an item between a source location and a destination location. In other examples, additional and/or fewer characteristics and/or parameters regarding the item, the transport, the source location, the destination location, etc., may be specified.

Figure 7:
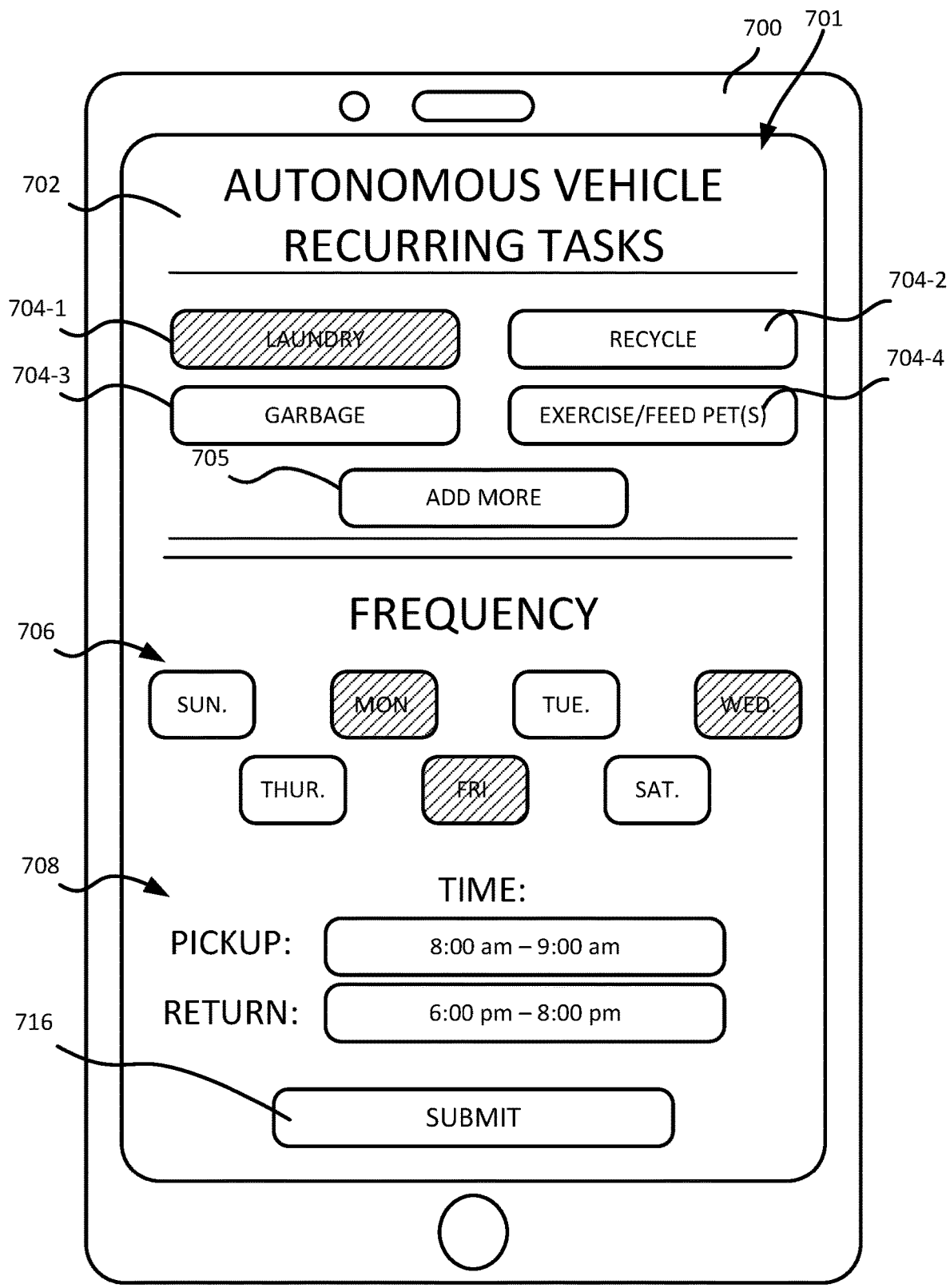
FIG. 7 illustrates a user interface for autonomous vehicle recurring task planning, in accordance with implementations of the present disclosure.

FIG. 7 illustrates a user interface 701 for autonomous vehicle recurring task planning that is presented on a display of a user device 700, in accordance with implementations of the present disclosure. The user interface 701 may be presented by a software application executing on the user device 700 and/or presented as a web interface, etc.

In the present example, the user interface provides an indication of four recurring tasks that have been subscribed to or assigned to a user of the user device 700. In this example the four recurring tasks are Laundry 704-1, Recycle 704-2, garbage 704-3, and feed pet 704-4. A user may select to add other recurring tasks by selecting the add more control 705. As discussed herein, the recurring tasks include tasks that may be automated and performed on a scheduled or recurring basis by one or more autonomous vehicles. For example, the removal of dirty laundry may be scheduled to recur on a periodic basis, and the return of clean laundry may also be scheduled. For example, referring to FIG. 7, the user has selected the recurring task laundry 704-1 and specified that a payload that includes dirty laundry is to be retrieved from the location on Monday, Wednesday, and Friday, as illustrated by the frequency selection controls 706. In addition, on the selected days, the dirty laundry is to be picked up from the location between 8:00 am-9:00 am and clean laundry is to be returned between 6:00 pm-8:00 pm, as illustrated by the time selection controls 708. A user may select to alter the frequency and/or time by interacting with the user interface 701. When the desired frequency and/or times for a recurring task has been completed, the user may submit the schedule for the recurring task by selecting the submit control.

As discussed above, for recurring tasks, such as garbage, laundry, recycling, feeding a pet, at the scheduled time, an autonomous vehicle is instructed to navigate to the location and perform the task. For example, if the task is to retrieve dirty laundry from the location on Monday, Wednesday, and Friday, between 8:00 am-9:00 am, at the scheduled time, the management service instructs an autonomous vehicle that is available and capable of engaging a payload that contains the dirty laundry to navigate to the location and retrieve the payload. The payload of dirty laundry may then be transported by the autonomous vehicle to a service that cleans laundry, thereby removing the need for users to clean their own laundry and/or own their own washer and dryer. Other recurring tasks may be scheduled and performed in a similar manner. Other recurring tasks, may include, for example, retrieving a pet and taking the pet to the groomers to have the pet washed and/or clipped, vacuuming floors, cleaning, mowing the lawn, etc.

Figure 8:
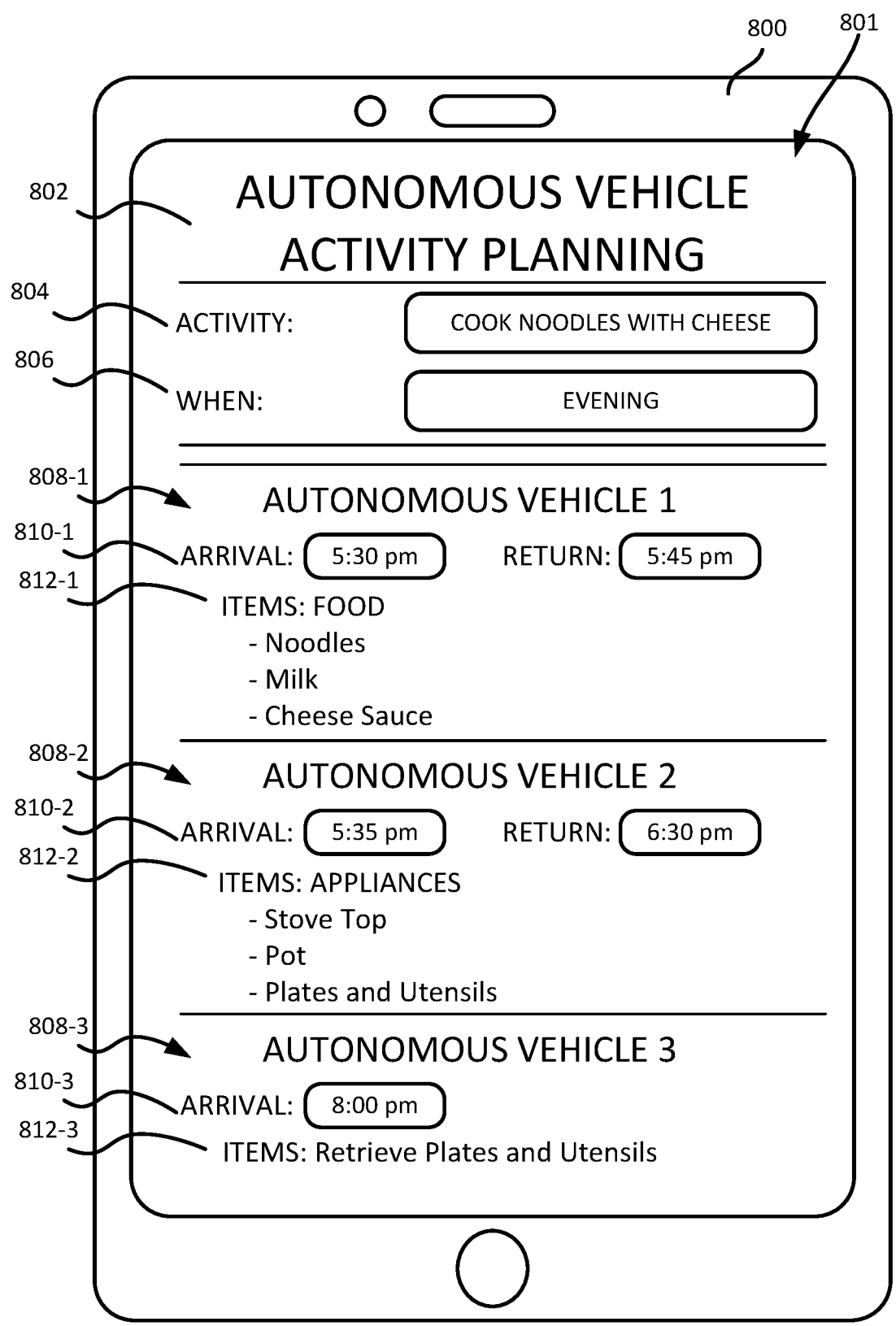
FIG. 8 illustrates a user interface for autonomous vehicle activity planning, in accordance with implementations of the present disclosure.

FIG. 8 illustrates a user interface 801 for autonomous vehicle activity planning presented on a display of a user device 800, in accordance with implementations of the present disclosure. The user interface 801 may be presented by a software application executing on the user device 800 and/or presented as a web interface, etc.

In the example user interface 801, a user, rather than specifying a task to be performed by an autonomous vehicle, may specify an activity 804 or task that the user desires to perform, and the management service will determine what items are needed by the user to perform the task or activity. For example, a user interacting with the user interface 801 may specify an activity 804 that the user desires to perform and specify a time 806 at which they desire to perform the activity. Rather than requiring the user to determine what items are needed for the activity, the management service may determine the items that are needed and plan the delivery of those items to a user specified location by one or more autonomous vehicles. In the illustrated example, the management service may determine that the user needs the food items to cook noodles with cheese, a stove top, pots, plates, and utensils. Based on the determined items for the activity, the management service may determine delivery of those items by one or more autonomous vehicles to occur at the same or different times so that the user can perform the activity at the desired time. For example, and referring to FIG. 8, the management service may determine that a first autonomous vehicle 808-1 is to transport the food items 812-1 of noodles, milk, and cheese sauce, to the location such that the autonomous vehicle arrives and departs at scheduled times 810-1. For example, the first autonomous vehicle 808-1 may be scheduled to arrive at approximately 5:30 pm and depart the location with those items at approximately 5:45 pm. In some implementations, the autonomous vehicle may arrive at the location and remain there until it later departs with the items. Alternatively, the first autonomous vehicle may deliver the food items to the location and depart from the location. At a later time, the same or different autonomous vehicle may receive instructions to arrive at the location and retrieve the food items such that the autonomous vehicle departs the location at the approximate departure time.

In a similar manner, the management service may schedule for a second autonomous vehicle 808-2 to transport appliances 812-2 to the location so that the user can cook the noodles on the appliance. In this example, the second autonomous vehicle delivers a stove top, pots, plates and utensils so that the user has the tools necessary to cook the desired items and plates, forks, etc. with which to eat the desired item. Like the delivery of the food items, the autonomous vehicle that delivers the appliances may be scheduled to deliver the items and/or retrieve the items at a defined time 810-2. In this example, the second autonomous vehicle is schedule to arrive with the appliances at approximately 5:35 pm and the appliances are to be retrieved and transported from the location at approximately 6:30 pm. In some implementations, the autonomous vehicle that delivers the items to the location may remain at the location until the items are to be removed. Alternatively, the autonomous vehicle may deliver the items to the location, depart, and at the scheduled time at which the items are to be removed from the location, the same or different autonomous vehicle may be instructed to arrive at the location, retrieve the items, and transport the items away from the location.

Finally, the management service may schedule a third autonomous vehicle 808-3 to arrive later in the evening to retrieve the plates and utensils used to eat the prepared food. In this example, the third autonomous vehicle is scheduled to arrive at approximately 8:00 pm, as illustrated by the arrival time 810-3 and to retrieve the used plates and utensils, as illustrated by the items 812-3.

As will be appreciated, different numbers and/or types of autonomous vehicles may be utilized for different activities and/or for delivery and retrieval of items and the example provided with respect to FIG. 8 is for explanation purposes only.

Figure 9:
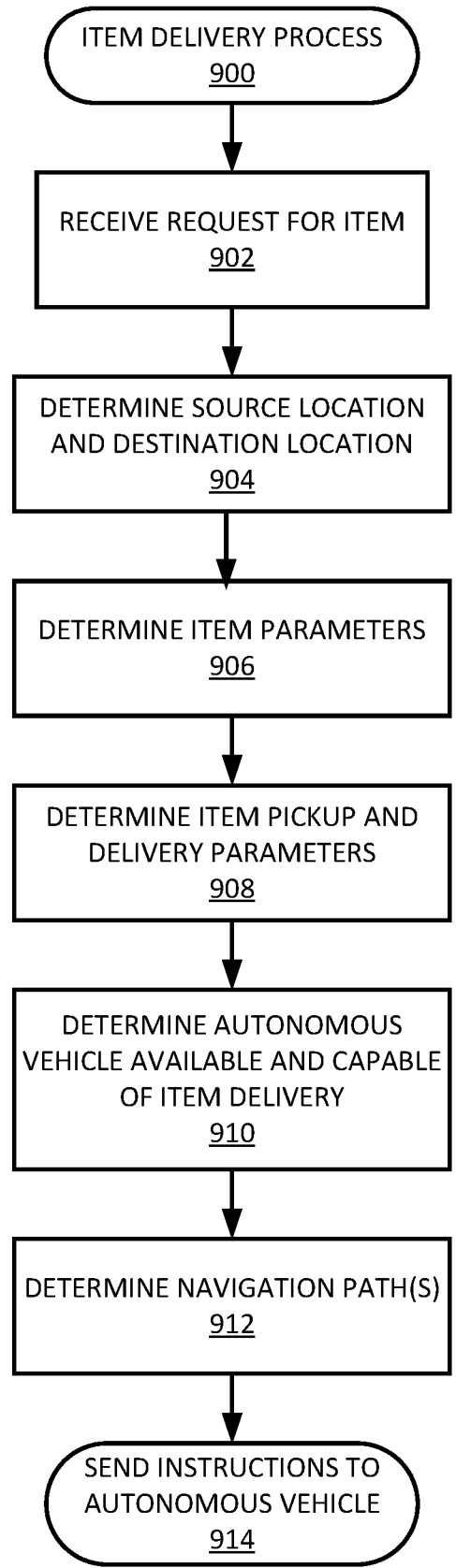
FIG. 9 is a flow diagram of an example item delivery process, in accordance with implementations of the present disclosure.

FIG. 9 is a flow diagram of an example item delivery process 900, in accordance with implementations of the present disclosure. The example process 900 begins upon receipt of a request for an item, as in 902. The request for the item, also referred to herein as an item request, may be an item to be delivered as part of a recurring task, an activity, an ordered item to be delivered to a destination location, etc. Upon receipt of an item request, a source location from which the item is to be retrieved and a destination location to which the item is to be delivered is determined, as in 904. For example, a user submitting the request may specify a source location and/or a destination location for an item. Alternatively, if the item is being ordered from a merchant and/or the item is stored in an inventory location, the source of the item may be determined by the management service as the merchant location or a known location of the stored item. In a similar manner, if the item is an ordered item, the destination location may be a user specified destination, or a current location of a user that ordered the item; as determined by, for example, position information obtained from a client device (e.g., smart phone) associated with the user.

The example process may also determine one or more item parameters with respect to the item, as in 906. Item parameters or characteristics may include, but are not limited to, a size of the item, item dimensions, a weight of the item, a fragility of the item, whether the item is considered hazardous, whether the item is to be transported in a temperature controlled environment, whether the item is perishable, etc. Likewise, one or more item pickup and/or item delivery parameters may also be determined, as in 908. Item pickup and/or delivery parameters may include, but are not limited to, whether the item will be placed on or in the autonomous vehicle at the source location by an agent or other vehicle, whether the item will be removed from the autonomous vehicle by an agent or other vehicle at the destination location, whether the item is to be left at the destination location, whether the item has particular engagement positions for which an engagement member of an autonomous vehicle may engage or disengage the item, the terrain and/or obstacles at the source location and/or the destination location, etc.

Based on the request for the item, the item parameters, the source location parameters, and the destination location parameters, a determination of an autonomous vehicle that is available and capable of transporting the item from the source location to the destination location is determined, as in 910. An autonomous vehicle is considered capable if the autonomous vehicle is able to transport the item according to the item parameters and is able to navigate the source location and the destination location, according to the source location and delivery location parameters. For example, if the item is to be transported in a temperature controlled environment and the source location and destination location have no obstacles, an autonomous vehicle that is capable of transporting items in a temperature controlled environment may be considered as an autonomous vehicle that is capable of transporting the item.

An autonomous vehicle may be considered available to transport the item, if the autonomous vehicle is within a distance of the source location such that the autonomous vehicle can navigate to the source location and retrieve the item within a desired timeframe and the autonomous vehicle is not currently assigned to another task that is to be performed by the autonomous vehicle while the item is being transported.

In some implementations, if an autonomous vehicle is not available and capable to transport the item at the requested time, one or more alternative times may be determined when an autonomous vehicle is available and capable to transport the item from the source location to the destination location. Those available times may be provided to a user or another entity that is requesting transport of the item and the user or other entity may request an alternative time.

Upon selection of an autonomous vehicle that is available and capable of transporting the item from the source location to the destination location, one or more navigation paths are determined, as in 912. A navigation path may include a route to be followed by the autonomous vehicle as part of the transport of the item from the source location to the destination location. For example, the navigation path may indicate a specific path to be followed by the autonomous vehicle. In other implementations, a navigation path may specify one or more waypoints, or points along the path to which the autonomous vehicle is to navigate as it traverses the navigation path. Likewise, the navigation path may specify a speed to be traveled by the autonomous vehicle as well as other factors.

Finally, the example process 900 sends instructions to the autonomous vehicle to navigate from a current position to the source location, retrieve the item from the source location, and transport the item to the destination location, as in 914. The instructions may also indicate whether the autonomous vehicle is to remain at the location while the item is used, or depart the location.

Figure 10:
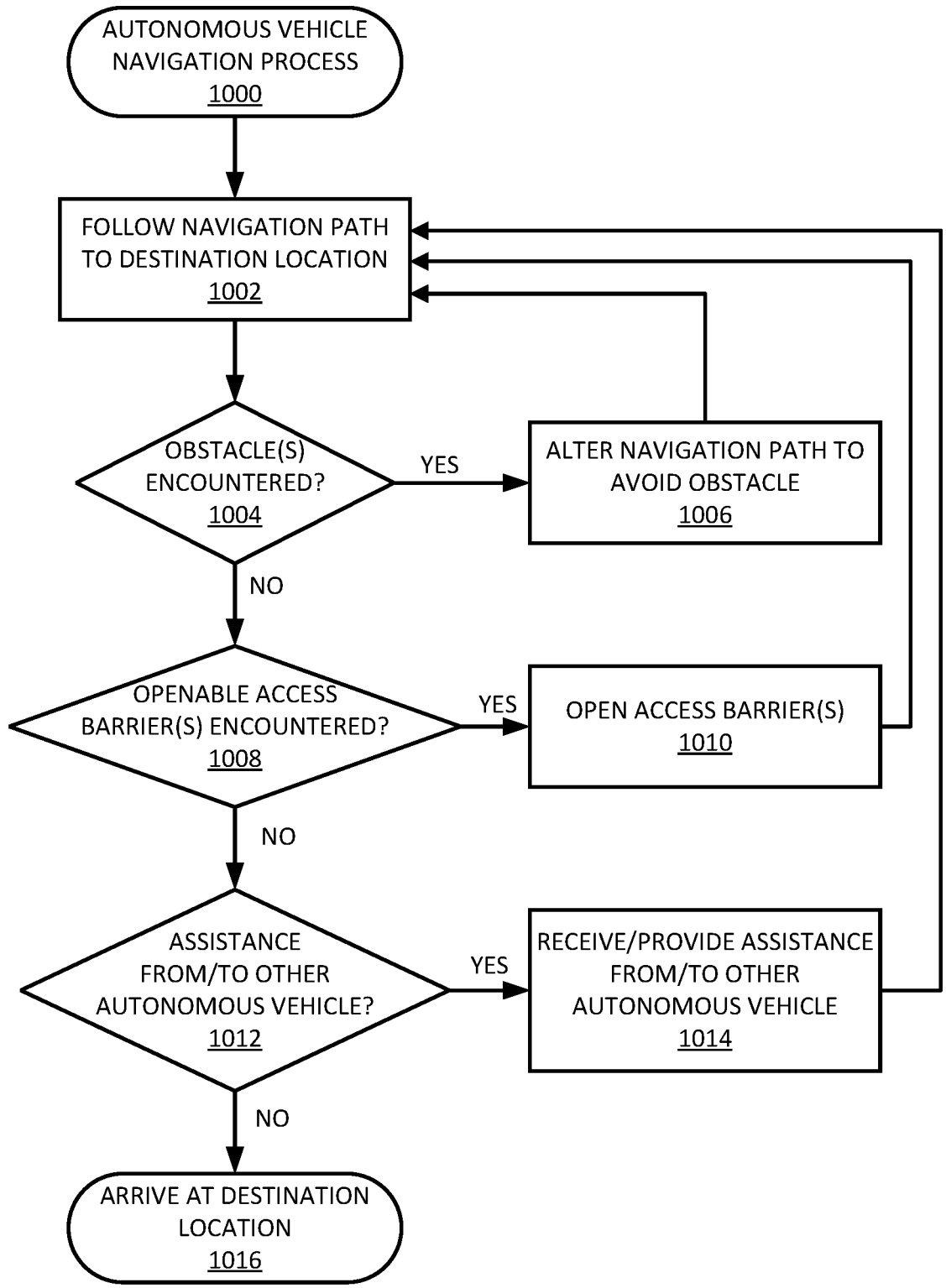
FIG. 10 is a flow diagram of an example autonomous vehicle navigation process, in accordance with implementations of the present disclosure.

FIG. 10 is a flow diagram of an example autonomous vehicle navigation process 1000, in accordance with implementations of the present disclosure. The example process begins with the autonomous vehicle following a navigation path to a location, as in 1002. In various implementations, autonomous vehicles may travel to and from different types of locations. For example, an autonomous vehicle may be deployed from a materials handling facility to a delivery location for delivering an item. As another example, an autonomous vehicle may travel from a source location (e.g., a location within a community) to a destination location within the same or different community.

In various implementations, autonomous vehicles may travel utilizing certain subterranean resources and/or pathways. For example, autonomous vehicles may travel along travel paths utilizing subways, tunnels, etc. It will be appreciated that by travelling along pathways that are less utilized (e.g., at certain times or otherwise), autonomous vehicles may be able to travel more efficiently and may be less likely to encounter congestion in certain areas, etc.

In various implementations, when a travel path is related to a delivery or transport of an item, the autonomous vehicles may receive an item to be delivered (e.g., from a merchant, another location, from a materials handling facility, etc.) at the beginning of the navigation path to the delivery location. In various implementations, different types of techniques may be utilized for the autonomous vehicle to receive an item. For example, an autonomous vehicle, materials handling facility, merchant, etc., may include an item engagement mechanism (e.g., a robotic arm, etc.) for engaging an item that is to be received by the autonomous vehicle (e.g., by placing the item in a storage compartment of the autonomous vehicle and/or by placing the item in a payload carrier attached to the autonomous vehicle, etc.). As another example, a human agent, carrier, user, etc. may take the item and place it in a storage compartment of the autonomous vehicle.

In various implementations, once the item is placed in the storage compartment, the storage compartment may be locked or otherwise secured for the transport of the item to a delivery location. For example, the storage compartment may include an electronic locking mechanism that may be controlled to lock the storage compartment once it is determined that the item has been placed in the storage compartment. The determination that an item has been placed in the storage compartment may be made according to various types of procedures. For example, an input may be received (e.g., by the autonomous vehicle control system) from a carrier, merchant, user, remote computing resource, management service, etc. that indicates that an item has been placed in the storage compartment that is to be delivered to a delivery location. As another example, various sensors may be utilized to determine that an item has been placed in the storage compartment and has thus been received by the autonomous vehicle. In various implementations, once the item is received, the autonomous vehicle may be instructed (e.g., by the management service, a remote computing resource, etc.) to travel to a destination location (e.g., user's residence) to deliver the item. In various implementations, once the item is received, a message may also be sent to a user (e.g., from the management service, the autonomous vehicle, etc.) that indicates that the autonomous vehicle has received the item and the message may also indicate an identification of the item (e.g., including a description or picture of the item taken by a sensor of the autonomous vehicle, etc.).

In various implementations, navigation path instructions and/or information may be received by the autonomous vehicle (e.g., from the management service). As part of the travelling along the navigation path, the propulsion portion of the autonomous vehicle may be controlled to navigate the autonomous vehicle along the navigation path to the location. As the navigation path toward the location is followed by the autonomous vehicle, a determination is made as to whether any obstacles are encountered, as in 1004. If obstacles are encountered, the navigation path to the location may be altered to avoid the obstacles, as in 1006. For example, autonomous vehicles that follow roadways, sidewalks, etc. may encounter obstacles (e.g., construction, blocked pathways, etc.) for which a different route may be calculated and taken. In various implementations, autonomous vehicles may also send/receive information regarding navigation paths, obstacles, etc. For example, an autonomous vehicle that encounters an obstacle may send a notification including data regarding the obstacle to a management service, other autonomous vehicles, etc. As part of such communications, other autonomous vehicles may also take different routes that are calculated based on the obstacles, such that data acquired by one autonomous vehicle may be utilized in the determinations of the navigation paths for other autonomous vehicles, etc. In addition to the navigation path being altered to avoid any obstacles, a determination is also made as to whether any openable access barriers (e.g., openable doors, gates, etc.) are encountered, as in 1008. If openable access barriers are encountered, the access barriers are opened to allow the autonomous vehicle to travel through the access barriers, as in 1010.

In various implementations, the autonomous vehicle may include an access mechanism that is configured to transmit a signal, or otherwise to cause an access barrier to be opened or otherwise unlocked to allow the autonomous vehicle to travel through or otherwise past the access barrier. For example, the autonomous vehicle may include an access mechanism that is configured to transmit a remote control signal to open an access barrier (e.g., a garage door) so as to allow the autonomous vehicle to pass through or around the barrier to travel to a location. As another example, an access barrier in a user's residence (location) that is sized specifically for the autonomous vehicle may include a sensing mechanism that senses an access mechanism of the autonomous vehicle for unlocking the access barrier and allowing the autonomous vehicle to pass through for travelling to a location. It is noted that if an access barrier is not openable, it may be treated as an obstacle according to the operations of blocks 1006 and 1008.

In various implementations, an autonomous vehicle may also utilize various types of assistance (e.g., from a human, another autonomous vehicle, another autonomous mechanism, etc.) as part of the navigation along a navigation path (e.g., in order to navigate past an obstacle or access barrier, etc.). In various implementations, an autonomous vehicle may utilize different mechanisms for requesting assistance. For example, an autonomous vehicle may request assistance by utilizing a speaker (e.g., with a synthesized voice to request that a doorman open a door, etc.), or a display or transmitted electronic message (e.g., with a request for assistance) in order to navigate past obstacles and/or access barriers, etc. As another example, a user may be queried (e.g., by a voice controlled assistant that can control an access mechanism, etc.) as to whether an autonomous vehicle that has arrived or is planned to arrive at a location should be allowed access past an access barrier (e.g., a door to the user's residence, etc.). In various implementations, a navigation path may be determined in part based on an availability of assistance at certain locations. For example, if it is determined that an elevator operator is available to provide assistance (e.g., for pressing a button or otherwise electronically selecting a particular floor on behalf of the autonomous vehicle, etc.), a navigation path may be planned that includes travel by the elevator.

As obstacles and/or access barriers are passed, it is further determined if the autonomous vehicle will receive assistance from, or provide assistance to, another autonomous vehicle, as in 1012. For example, an autonomous vehicle may require assistance to navigate past an obstacle (e.g., a barrier, etc.), for which another autonomous vehicle (e.g., a UAV, etc.) may engage the autonomous vehicles and/or item to be delivered and assist (e.g., through flying, lifting, etc.) in navigating past the obstacle to reach the delivery location. As another example, it may be undesirable for the another autonomous vehicle (e.g., a UAV) to navigate (e.g., fly) along a final portion of a navigation path to the delivery location (e.g., due to undesirable noise levels, safety issues in proximity to the delivery location, etc.) for which it may be preferred to have the autonomous vehicle carry or otherwise assist the other autonomous vehicle and/or item to be delivered in reaching the delivery location. If is determined that assistance is to be received from, or provided to, another autonomous vehicle, the autonomous vehicle performs the associated procedures to receive or provide the assistance, as in 1014.

As obstacles and/or access barriers are passed and any assistance is received or provided, the autonomous vehicle continues to travel along the navigation path, as in 1002, and if additional obstacles and/or access barriers are encountered, and/or if additional assistance is to be received/provided from or to another autonomous vehicle, the process is repeated, as in 1004, 1008 and/or 1012. Once the autonomous vehicle has passed any remaining obstacles and access barriers and has received or provided any needed assistance from/to other autonomous vehicles as it continues to travel along the navigation path, the autonomous vehicle arrives at the location, as in 1016. Once the autonomous vehicle arrives at the location, notification(s) may be sent indicating the arrival at the location (e.g., to the management service, merchant, user, etc.), as in 1018. In various implementations, if the autonomous vehicle is delivering an item (e.g., to a user's residence), a notification may be included as part of a message that is sent to a user, etc. (e.g., from the autonomous vehicles, management service, etc.), which indicates that an item is being delivered and may also include information indicating an identification of the item (e.g., a description of the item, a picture of the item in the storage compartment as taken by an image capture sensor of the autonomous vehicles, etc.).

In various implementations, the engagement of an item at a source location and/or delivery of an item at a delivery location may be performed by following various procedures. For example, an item engagement mechanism (e.g., a robotic arm) of the autonomous vehicle, source location and/or delivery location may be utilized to place the item onto or into the autonomous vehicle, remove the item from the storage compartment of the autonomous vehicle and place the item at the delivery location (e.g., in a corner of the floor, on a counter, in a refrigerator, etc.). As another example, a delivery may consist of the autonomous vehicle waiting at the delivery location until a user arrives and removes the item from the storage compartment of the autonomous vehicle. In some instances, a user or other entity may be required to perform an action to unlock or otherwise open the storage compartment (e.g., by interacting with the user interface of the autonomous vehicle and entering an access code, or sending a signal from a smart phone, or utilizing another electronic or mechanical opening device, etc.) In response to such unlocking procedures, the locking mechanism is controlled to unlock the storage compartment to enable the item to be removed from the storage compartment at the delivery location (e.g., by the user, etc.). In other instances, the locking mechanism may be controlled to automatically unlock the storage compartment once an autonomous vehicle reaches a delivery location (e.g., according to a sensed location of the autonomous vehicle, or according to a signal from a transmitting device within a user's residence or doorway, etc.).

After the item is delivered, a determination may also be made as to whether the autonomous vehicle is to remain at the delivery location and later remove the item from the delivery location, or navigate away from the delivery location. In some implementations, if the autonomous vehicle is to remain at the delivery location for a period of time, the autonomous vehicle may couple to a charging station at the delivery location and charge a power supply of the autonomous vehicle and/or power an item carried by the autonomous vehicle (e.g., an appliance). For example, the delivery location may include a charging station or other facilities for the autonomous vehicle (e.g., an inductive charging station that the autonomous vehicle engages when the autonomous vehicle is at the delivery location, etc.).

Figure 11:
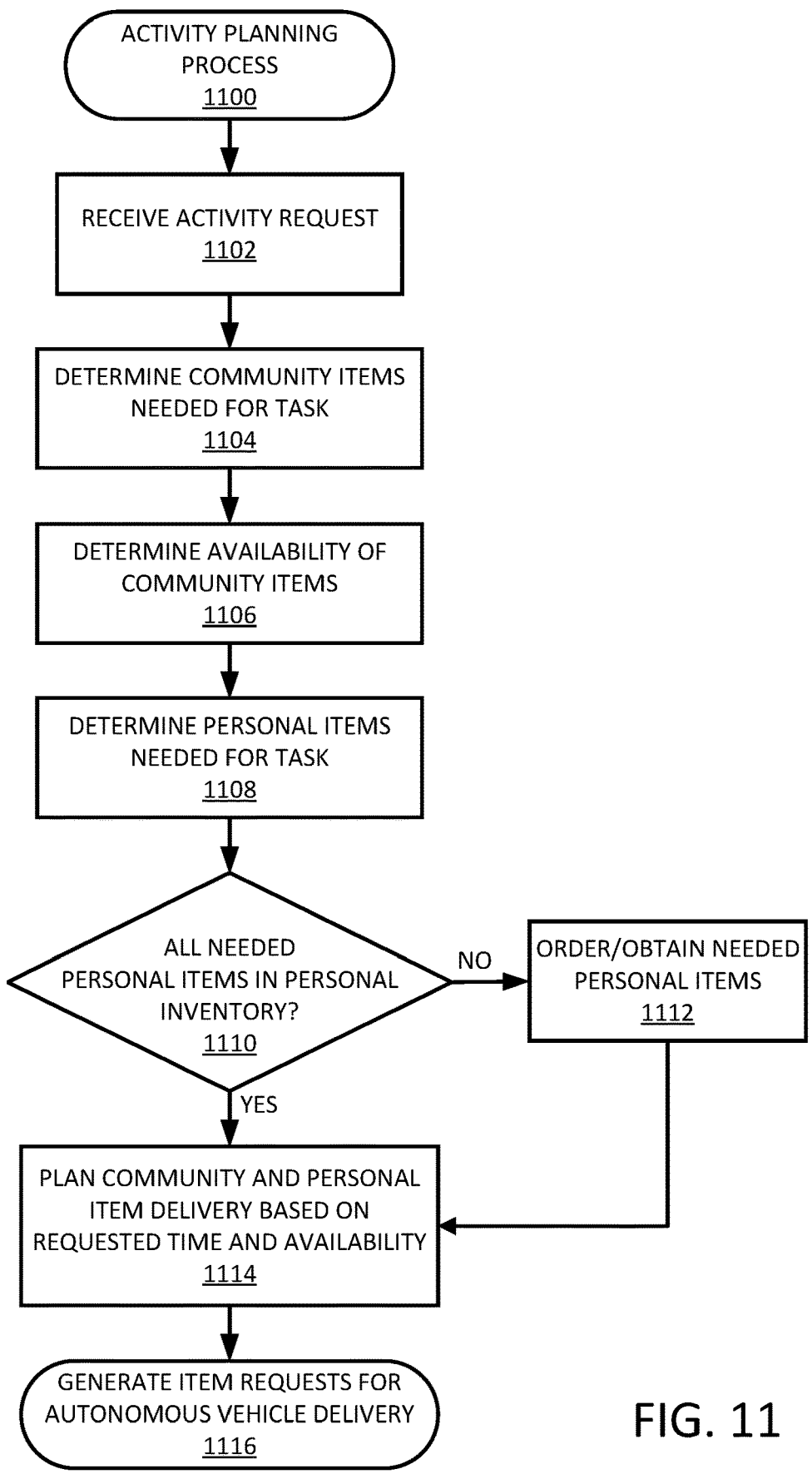
FIG. 11 is a flow diagram of an example task planning process, in accordance with implementations of the present disclosure.

FIG. 11 is a flow diagram of an example task or activity planning process 1100, in accordance with implementations of the present disclosure. The example process 1100 begins upon receipt of an activity or task request, as in 1102. As discussed above, an activity request may specify an activity that the requester (i.e., users) desires to perform. For example, an activity request may be a request to cook a meal or particular food items, a request to play a game, a request to watch a television, a request to do landscaping work around the house, etc. In some implementations, a user may select from one of a plurality of defined activity requests for which items may be determined and delivered to a user by one or more autonomous vehicles so that the user can perform the activity. In other implementations, a user may specify any activity and the management service will determine the items needed for the user to perform the activity and instruct autonomous vehicles to deliver those items to the user.

Returning to FIG. 11, in response to receiving an activity request, the community items needed to perform the activity request are determined, as in 1104. Determination of community items may consider all items needed to perform the activity, all items currently at the destination location at which the activity is to be performed, personal items owned or otherwise associated with the user that may be utilized to perform the activity, and the community items that are available. For example, if the activity is a request to cook noodles with cheese sauce, the items needed to perform the activity (e.g., stove top, pot, mixing spoon, measuring cups, plates, and utensils) are determined. For each of those items, a determination is made as to whether the item is already located at the destination location and if not, whether the item is available as a community item. If the item is available as a community item, a further determination may be made as to whether that community item is available for use by the user during the requested time for performing the activity. If the item exists as a community item and is available at the requested time, the item is considered an available community item. In some implementations, it may also be determined whether the item corresponds to a personally owed item of the user. If the item corresponds to a personally owned item of the user, the personally owned item may be selected for transport to the user rather than the community item.

If a community item is not available at the requested time, one or more alternative times may be determined during which the community item is available. In such an example, as discussed further below, alternative times of availability may be considered with respect to all items for the activity and only alternative times in which all items (community items, personal items) are available for the activity may be suggested. Upon determination of alternative available times, those alternative available times may be suggested to the user and the user can select an alternative time for the activity.

In addition to determining availability of community items needed for the activity, personal items needed for the activity are also determined, as in 1108. Personal items are items owned or otherwise associated with the user. Personal items may include, for example, consumables (e.g., food, paper plates, towels, etc.). In the current example, the personal items needed to prepare noodles with cheese sauce, may include noodles, cheese sauce, and napkins.

A determination is then made as to whether all needed personal items exist in personal inventory associated with the user that submitted the request, as in 1110. As discussed above, users may maintain personal items as allocated inventory in a materials handling facility. The management service may maintain information for each user as to what items and the quantity of those items are maintained in the allocated inventory. If it is determined that all needed personal items are not associated with the user and maintained in the allocated inventory, the missing items may be ordered and/or otherwise obtained, as in 1112. For example, if the personal items that are not associated with the user are maintained as unallocated inventory in the materials handling facility, those items may be purchased by the user and become allocated inventory associated with the user. If the needed personal item(s) are also not available as unallocated inventory, the item may be purchased for delivery to the user.

In some implementations, if a needed personal item is not associated with the user and not available from unallocated inventory, a determination may be made as to whether the personal item is associated with another user and maintained in allocated inventory on behalf of the other user. In such an instance, a request may be sent to the other user requesting to purchase the item from the other user and/or to utilize that other users item while a replacement is transported to the materials handling facility. For example, if the personal item is noodles, but the user that submitted the activity request does not have any noodles, the example process 1100 may determine a second user that does have noodles in the allocated inventory and submit a request to that second user requesting to purchase and/or use those noodles. The request may also indicate that additional noodles have been ordered and will be delivered to the materials handling facility within a defined period to replace the noodles of the second user. Alternatively, the second user may select to sell and not replace the item, or the user may reject the request.

If a community item and/or personal item is not available at the requested time, one or more alternative times may be determined during which the items (personal item, community item) is available for the activity. Alternative times of availability may be considered with respect to all items for the activity and only alternative times in which all items needed for the activity, and all autonomous vehicles needed to transport those items (FIG. 9), are available for the activity may be suggested. Upon determination of alternative available times, those alternative available times may be suggested to the user and the user can select an alternative time for the activity.

After obtaining any needed but not owned personal items from unallocated inventory, from allocated inventory of a second user, or from another location, or if it is determined that all needed personal items exist in the allocated inventory associated with the user, delivery by one or more autonomous vehicles of the community and/or personal items is planned, as in 1114. Planning of the delivery of personal items and community items may include determining a travel time between the source location of the items (e.g., the materials handling facility) and the destination location, the number of autonomous vehicles needed to transport the items, a duration of time the items are to remain at the destination location, etc. In some instances, all items (community and personal) for an activity may be combined at the materials handling facility and transported to the destination location by a single autonomous vehicle. In other implementations, multiple autonomous vehicles may transport different items from the materials handling facility to the destination location. For example, a first autonomous vehicle may transport the appliance (e.g., stove top) needed for the activity and a second autonomous vehicle may transport the other items needed for the activity.

Likewise, as part of the delivery planning it may be determined whether the autonomous vehicle is to remain at the destination location with the delivered item or depart the destination location upon delivery of the item. For example, the autonomous vehicle that delivers the appliance may be configured to remain coupled to the appliance and remain at the location until use of the appliance has completed. When use of the appliance has completed, the autonomous vehicle may depart the location with the appliance. Alternatively, the autonomous vehicle that delivers the pots, pans, and/or other utensils, may delivery those items and then depart the delivery location to perform other tasks. At a later time, the same or different autonomous vehicle may be instructed to return and retrieve the items from the destination location.

Upon planning of the item delivery and/or return from the destination location, item requests for the items are generated and sent to one or more autonomous vehicles instructing those vehicles to deliver one or more items from a source location to a destination location according to the delivery plans, as in 1116.

The systems and methods of the present disclosure are directed to utilizing autonomous vehicles to delivery items, etc. The information or data that may be captured and reported by one or more autonomous vehicles, or obtained from any intrinsic, extrinsic sources and/or emergency personnel, and utilized to generate or modify navigation paths in accordance with the present disclosure is not limited. For example, such information or data may be qualitative in nature, e.g., paths, speeds, lighting levels, positions, times or dates, battery life, fuel levels or carrying capacities expressed in numeric terms. The information or data may also be qualitative in nature, e.g., courses, speeds, positions, times or dates of arrival or departure, battery life, fuel levels or carrying capacities expressed in words such as "northeast," "south," "slow," "fast," "high," "valley," "waypoint," "tilt," "Sunday," "low light," "poor lighting," "good lighting," "safe," "dangerous," "full charge," "half tank," etc.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 9-11, orders in which such methods or processes are presented are not intended to be construed as any limitation on the claims, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method comprising:
    receiving an activity request;
    determining, from a plurality of items, an item for performing an activity included in the activity request, the item to be delivered by an autonomous ground vehicle (AGV), and wherein the item is a shared community item usable among a plurality of users within a community and the activity request indicates a destination location for the activity request;
    allocating, by at least one server, use of the item to one of the plurality of users for a period of time;
    determining, by the at least one server, a source location where the item is located;
    determining, based at least in part on the item, the source location, and the destination location, an AGV that is available and capable of transporting the item from the source location to the destination location;
    sending an instruction to the AGV to navigate to the source location, retrieve the item, and transport the item to the destination location;
    sending a second instruction to the AGV to depart from the destination location;
    determining that the period of time has elapsed; and
    in response to determining that the period of time has elapsed, sending a third instruction to the AGV to navigate to the destination location to retrieve the item from the destination location and transport the item from the destination location so that the item is available for reuse by another user from the plurality of users.

2. The computer-implemented method of claim 1, further comprising:
    determining a first navigation path for the AGV from a current location of the AGV to the source location;
    determining a second navigation path for the AGV from the source location to the destination location; and
    wherein the instructions include an indication of the first navigation path and the second navigation path.

3. The computer-implemented method of claim 1, further comprising:
    determining an item parameter corresponding to the item, wherein the item parameter includes at least one of a weight of the item, a dimension of the item, a storage characteristic of the item, or a type of the item; and
    wherein determining an AGV that is available and capable of transporting the item is further based at least in part on the item parameter.

4. The computer-implemented method of claim 1, further comprising:
    determining at least one of an item pickup parameter or an item delivery parameter; and
    wherein:
        the item pickup parameter indicates at least one of an attachment capability of the item at the source location, a first time at which the item is available for retrieval, or a first duration of time that the item is available; and
        the item delivery parameter indicates at least one of a detachment capability of the item at the destination location, a second time at which the item is to arrive at the destination location, or the period of time that the item is to be at the destination location.

5. The computer-implemented method of claim 1, wherein:
    the source location is a materials handling facility that stores a plurality of items for a community of users; and
    the item is at least one of a personal item maintained at the materials handling facility and owned by a user of the community of users, or a community item maintained at the materials handling facility and usable by each user of the community of users.

6. The computer-implemented method of claim 1, wherein the activity request includes a requested time, and the computer-implemented method further comprises determining that the item is available at the requested time.

7. The computer-implemented method of claim 1, wherein the activity request includes a requested time, and the computer-implemented method further comprises:
determining that the item is not available at the requested time;
determining one or more alternate times at which the item is available; and
receiving an alternate time from the one or more alternate times.

8. The computer-implemented method of claim 1, further comprising:
determining a personal item associated with the activity request; and
sending an instruction to the AGV to retrieve the personal item and transport the personal item to the destination location.

9. The computer-implemented method of claim 1, wherein the AGV is associated with the community.

10. A method, comprising:
determining a task to be performed;
determining, from a plurality of items, an item associated with the task to be performed;
determining that the item is to be retrieved from a source location and transported to a destination location by an autonomous vehicle of the plurality of autonomous vehicles as part of the task, wherein the item is a shared community item usable among a plurality of users;
determining a time duration that the item is to remain at the destination location;
allocating use of the item to one of the plurality of users for the time duration;
sending a first instruction to the autonomous vehicle of the plurality of autonomous vehicles to navigate to the source location, retrieve the item, and navigate to the destination location to make the item available at the destination location;
sending a second instruction to the autonomous vehicle to depart the destination location;
determining that the time duration has elapsed; and
sending a third instruction to the autonomous vehicle of the plurality of autonomous vehicles to navigate to the destination location to retrieve the item from the destination location and transport the item from the destination location so that the item is available for reuse by another user from the plurality of users.

11. The method of claim 10, further comprising:
determining a second item to be transported to the destination location by the autonomous vehicle or a second autonomous vehicle of the plurality of autonomous vehicles as part of the task; and
sending a fourth instruction to the autonomous vehicle or the second autonomous vehicle to transport the second item to the destination location to make the second item available at the destination location.

12. The method of claim 11, wherein:
the second item is at least one of a personal item owned by a user or an item ordered for purchase by the user.

13. The method of claim 10, wherein:
the source location is a personal residence;
the destination location is a business that provides a service;
the time duration includes a time to perform the service with respect to the item; and
wherein the third instruction includes an instruction to transport the item back to the source location.

14. The method of claim 13, wherein:
the service includes a cleaning service that cleans the item; and
the item is at least one of an item of clothing, a dish, a cooking utensil, or an animal.

15. The method of claim 10, wherein the item is at least one of an appliance, a cooking instrument, a tool, or a container into which other items may be placed.

16. The method of claim 10, further comprising:
determining a time at which the task is to be performed at the destination location; and
planning a navigation of the autonomous vehicle of the plurality of autonomous vehicles such that the autonomous vehicle of the plurality of autonomous vehicles arrives at the destination location at a scheduled time corresponding to the time.

17. The method of claim 10, wherein:
the first instruction is sent to a first autonomous vehicle of the plurality of autonomous vehicles; and
the third instruction is sent to a second autonomous vehicle of the plurality of autonomous vehicles.

* * * * *